United States Patent [19]
Katsurahira et al.

[11] Patent Number: 5,644,108
[45] Date of Patent: Jul. 1, 1997

[54] POSITION DETECTION DEVICE UTILIZING ELECTROMAGNETIC INDUCTION

[75] Inventors: Yuji Katsurahira; Yasuhiro Fukuzaki, both of Saitama-ken, Japan

[73] Assignee: WACOM Co., Ltd., Saitama-ken, Japan

[21] Appl. No.: 503,815

[22] Filed: Jul. 13, 1995

[30] Foreign Application Priority Data

Jul. 18, 1994 [JP] Japan .................................. 6-165495

[51] Int. Cl.⁶ .............................. G08C 21/00; G09G 3/02
[52] U.S. Cl. .............................. 178/18; 178/19; 345/174; 345/176; 345/178
[58] Field of Search ........................ 178/18, 19; 345/173, 345/174, 176, 177, 178

[56] References Cited

U.S. PATENT DOCUMENTS

| | | | |
|---|---|---|---|
| 3,819,857 | 6/1974 | Inokuchi | 178/19 |
| 4,678,870 | 7/1987 | Taguchi | 178/19 |
| 4,810,838 | 3/1989 | Ichinokawa | 178/19 |
| 4,947,156 | 8/1990 | Sato | 178/18 |
| 5,120,907 | 6/1992 | Shinbori | 178/19 |
| 5,130,500 | 7/1992 | Murakami | 178/19 |
| 5,218,173 | 6/1993 | Garwin | 178/18 |

*Primary Examiner*—Curtis Kuntz
*Assistant Examiner*—Vijay Shankar
*Attorney, Agent, or Firm*—Tarolli, Sundheim, Covell, Tummino & Szabo

[57] ABSTRACT

A position indicator having an oscillation circuit consisting of a first coil for detecting coordinates and a condenser, wherein a control coil and the first coil are placed side by side in such a manner that an induced current running through the first coil surrounds a part of a magnetic flux generated at the first coil and the control coil is controlled to be opened/closed and a distribution of a magnetic flux passing the first coil is varied, which enables an angle of rotation and angle of inclination for the position indicator to be detected.

89 Claims, 25 Drawing Sheets

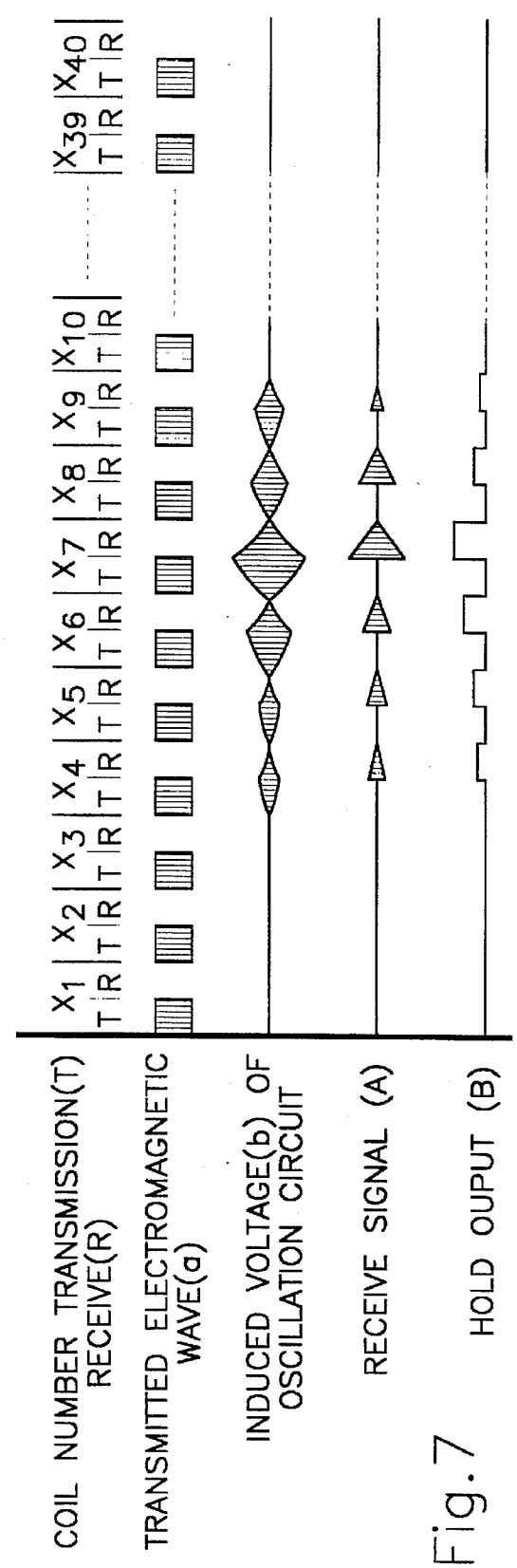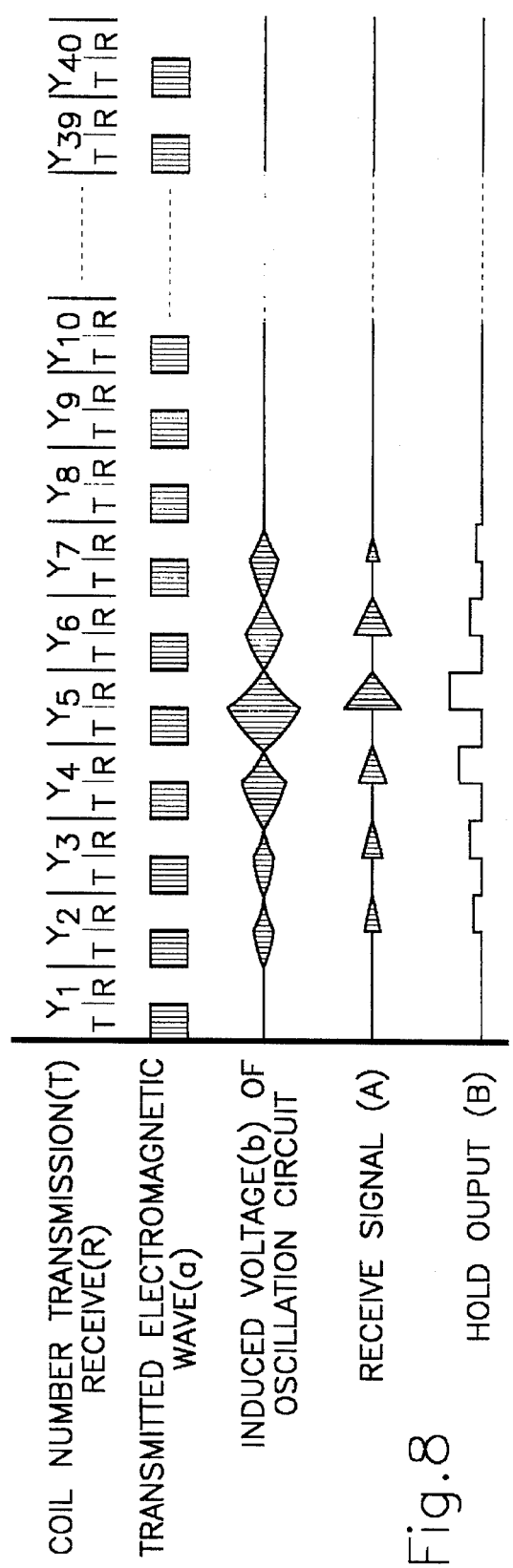

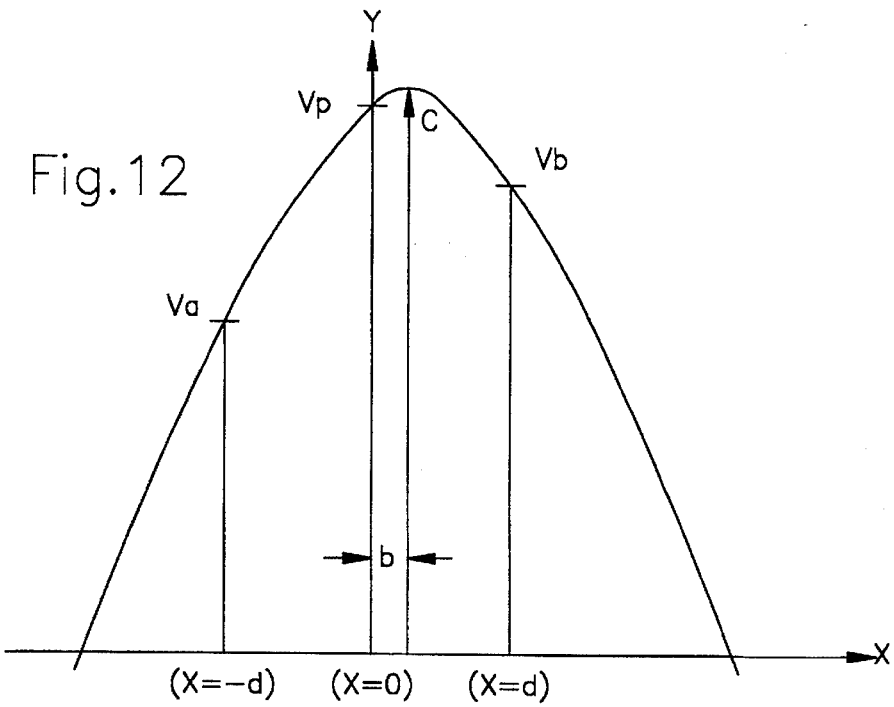
Fig. 12
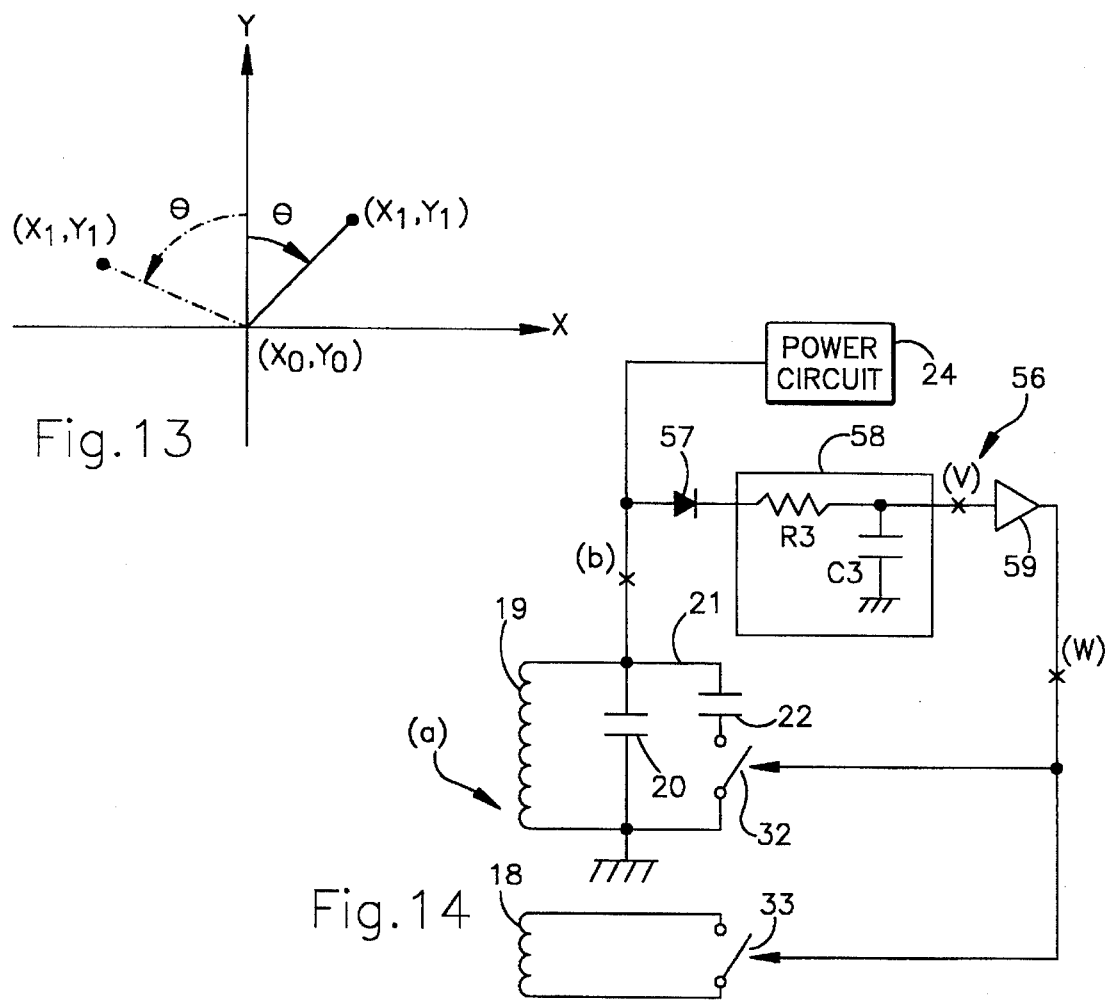
Fig. 13
Fig. 14

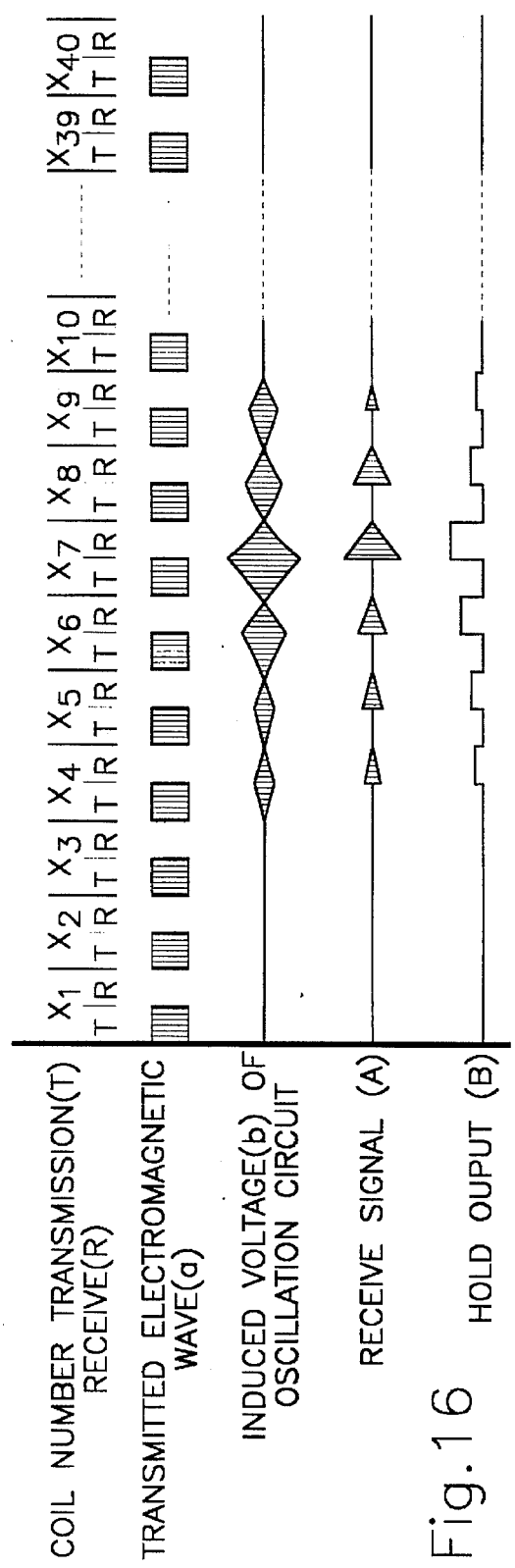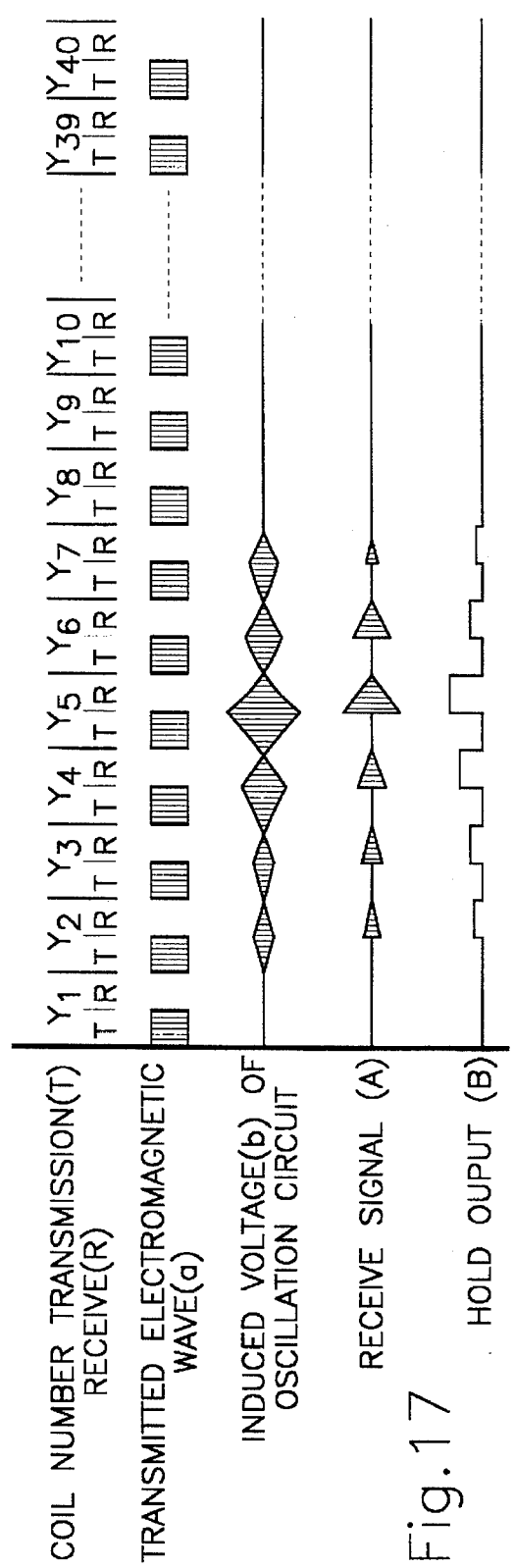

POSITION DETECTION DEVICE UTILIZING ELECTROMAGNETIC INDUCTION

BACKGROUND OF THE INVENTION

1. Industrial Field of the Invention

The present invention relates to a position detector utilizing electromagnetic induction and its position indicator and especially to a position detector and its position indicator, wherein an inclination of the pen-shaped position indicator and an angle of rotation thereof in the vertical direction in relation to the tablet surface are detected.

2. Prior art

The conventional device of this kind is used for inputting characters and pictures via a pen-shaped position indicator. However, there has been a demand that not only characters and pictures be input in accordance with coordinates but also such factors as angle of a user's arm and rotation and inclination of a pen should also be input as data.

In order to meet such a demand, various kinds of position detectors and position indicators have been developed (for example, Japanese Patent Public Disclosure No. 210450/1993, Japanese Patent Publication Nos. 16506/1983, 1764/1988, Japanese Patent Disclosure No. 67320/1991).

However, the conventional position detectors and position indicators cannot detect an inclination or rotation angle of a pen when the tip of the pen is located on the periphery of an effective area where coordinates on the tablet can be detected.

Furthermore, according to the conventional position detectors and position indicators, a detection coil for detecting an inclination and rotation angle of a position indicator is separately installed in the position indicator and thus, a pen tends to become bulky.

SUMMARY OF THE INVENTION

The present invention has been accomplished with a view to obviating the aforementioned problems, the object of which is to provide a position detector and its position indicator, wherein an inclination of the position indicator and rotation angle thereof in the vertical direction in relation to the tablet surface of the position detector can be accurately detected even on the periphery of an effective area of the position detector without the position indicator becoming bulky and the position indicator is provided with only one oscillation circuit to thereby facilitate adjustment and coordination at the time of manufacturing and enhance manufacturing efficiency.

According to a position indicator of the present invention, a coordinate indicating part thereof is provided with two magnetic substance cores (ferrite material is preferable; cores are not necessarily required), a transmitting coil wound around the two cores and a control coil wound around only one of the two cores. The transmitting coil is connected to an AC signal generation means to emit an electric wave, whereby the position indicator becomes detectable on a tablet. The control coil is connected to a control means, whereby an electric current induced into the control coil from an AC magnetic field generated by the AC current running through the transmitting coil is controlled. It is controlled in two different conditions, that is, where induced current runs (short-circuit) and where induced current does not run (open-circuit). Coordinates detected on the tablet side when induced current does not run through the control coil (open-circuit) correspond to the coordinates representing the intermediate position between the two cores. On the other hand, when induced current runs through the control coil (short circuit), the core around which the control coil is wound does not easily transmit a magnetic flux and thus, a magnetic flux converges on the other control coil. Therefore, coordinates detected on the tablet tend to be closer to the core without the control coil rather than to the intermediate point between the cores. Thus, not only coordinates corresponding to the intermediate point between the two cores but also a rotation angle in relation to the axis of the cores of the position indicator.

According to another position indicator of the present invention, a coordinate indicating part thereof is provided with three magnetic body cores (ferrite is preferable; cores are not necessarily required), a transmission coil wound around the three cores and three control coils wound respectively around the three cores. The control coils are respectively connected to control means, whereby an electric current induced into the control coil from an AC magnetic field to be generated by the AC current running through the transmission coil is controlled. The control means are controlled under two different conditions, that is, where induced current runs (short circuit) and where induced current does not run (open circuit). Coordinates detected on the tablet when induced current does not run through any of the control coils (open circuit) correspond to the coordinates of the intermediate point of the three cores. On the other hand, when induced current runs through one of the control coils (short circuit), the core with the control coil through which induced current runs does not transmit magnetic flux efficiently and therefore, coordinates detected on the tablet tend to move in the opposite direction of the core with a control coil through which induced current runs rather than to the intermediate point of the three cores. From the direction of movement of the coordinates, a rotation angle in relation to the axis of the position indicator is detected. Furthermore, from the three coordinates in the case where the three control coils are respectively controlled, the coordinates of the intermediate point of the three cores and rotation angle in relation to the axis of the cores of the position indicator can be found. It is also possible to find a rotation angle in relation to the axis of the cores of the position indicator by finding the three coordinates corresponding to the positions of the three cores with one of the three coils being open and the remaining two being short-circuited.

According to another position indicator of the present invention, a coordinate indicating part thereof is provided with two magnetic body cores (ferrite is preferable; cores are not necessarily required) and a coil wound around the two cores is connected to a condenser to comprise an oscillation circuit, wherein a position thereof can be detected via transmission/reception of an electric wave to/from a tablet. A control coil is wound around one of the two cores in such a manner that a part of a magnetic flux generated in response to an electric wave from a tablet by the oscillation circuit passes the control coil.

In the case where induced current does not run through the control coil (open), a magnetic flux is uniformly distributed over the two cores and therefore, the coordinates detected on the tablet indicate the intermediate point of the two cores. On the other hand, when induced current runs through the control coil (short circuit), the core around which a control core is wound does not easily transmit a magnetic flux and thus, a magnetic flux converges on the other core. Therefore, the coordinates detected on the tablet move closer to the core around which the control coil is not wound rather than to the intermediate point between the two cores. Accordingly, not only the coordinates corresponding to the intermediate point between the two cores but also a rotation angle in relation to the axial of the cores of the position indicator can be detected. A resonance frequency of the oscillation circuit needs to coincide with the frequency of electric wave emitted on the tablet side. However, as inductance of the coil comprising the oscillation circuit changes when the control circuit located inside the oscillation circuit is controlled, the resonance frequency control means for maintaining the resonance frequency constant in response to control is also provided.

According to another position indicator of the present invention, the coordinate indication part of the position indicator is provided with three magnetic body cores (ferrite is preferable; cores are not necessarily required), and a coil winding around the three cores is connected to a condenser to comprise an oscillation circuit, wherein the location of the position indicator can be detected by transmission/reception of an electric wave between the tablet and the oscillation circuit. The control coils are respectively wound around the three cores in such a manner that a part of magnetic flux generated in response to an electric wave from the tablet by the oscillation circuit passes through the control coils.

In the case where an induction current does not run through any of the control coils (open), a magnetic flux is spread uniformly among the three cores and, therefore, the coordinates detected on the tablet represent the intermediate point of the three cores. On the other hand, in the case where an induction current runs through one of the control coils (short circuit), the core around which the control coil is wound does not easily transmit a magnetic flux and, therefore, the coordinates detected on the tablet move opposite to the core with the control coil through which induced current runs through rather than in the direction of the coordinates corresponding to the intermediate point of the three cores. A rotation angle in relation to the axis of the core can be found on the basis of the direction of the coordinates. Furthermore, from the three coordinates in the case where the three control coils are respectively controlled, the coordinates corresponding to the intermediate point of the three cores and rotation angle in relation to the axis of the core of the position indicator can be found. If only one of the three control coils is open with the remaining two coils being simultaneously short-circuited, the three coordinates corresponding to the positions of the respective cores are found to thereby detect a rotation angle in relation to the axial direction of the core of the position indicator.

The resonance frequency of the oscillation circuit needs to coincide with the frequency of electric wave emitted on the tablet. However, as inductance of the coil comprising the oscillation circuit changes when the control coil located inside the oscillation circuit is controlled, the resonance frequency control means for maintaining the resonance frequency constant in response to control is also provided.

Thus, the coordinates of points adjacent to each other can be easily detected without causing interference between cores.

Furthermore, an inclination of the position indicator and rotation angle with an axis vertical to the tablet of the position detector can be accurately detected even on the periphery of an effective area of the position detector without making the position indicator inconveniently thicker and the position indicator is provided with only one oscillation circuit to thereby make adjustment and coordination easy at the time of manufacturing and enhance manufacturing efficacy.

Further, since control information is sent to the position indicator in the form of binary code, constitution of the circuit in the position indicator can remain simple.

BRIEF DESCRIPTION OF THE DRAWINGS

FIG. 3 is an illustration for explaining an oscillation circuit part of the position indicator.

FIG. 7 is an enlarged fragmentary view of a portion of FIG. 6.

FIG. 8 is an enlarged fragmentary view of a portion of FIG. 6.

FIG. 12 is a graph for explaining a principle of coordinates interpolation.

FIG. 13 is a graph for explaining a rotation angle.

FIG. 14 is a circuit diagram showing an essential part of the position indicator according to the second embodiment.

FIG. 16 is an enlarged fragmentary view of a portion of FIG. 15.

FIG. 17 is an enlarged fragmentary view of a portion of FIG. 15.

DETAILED DESCRIPTION OF THE PREFERRED EMBODIMENT

A first embodiment of the present invention will be explained by way of drawings.

The first embodiment concerns the case where a rotation angle of a position indicator can be detected.

Figure 1:
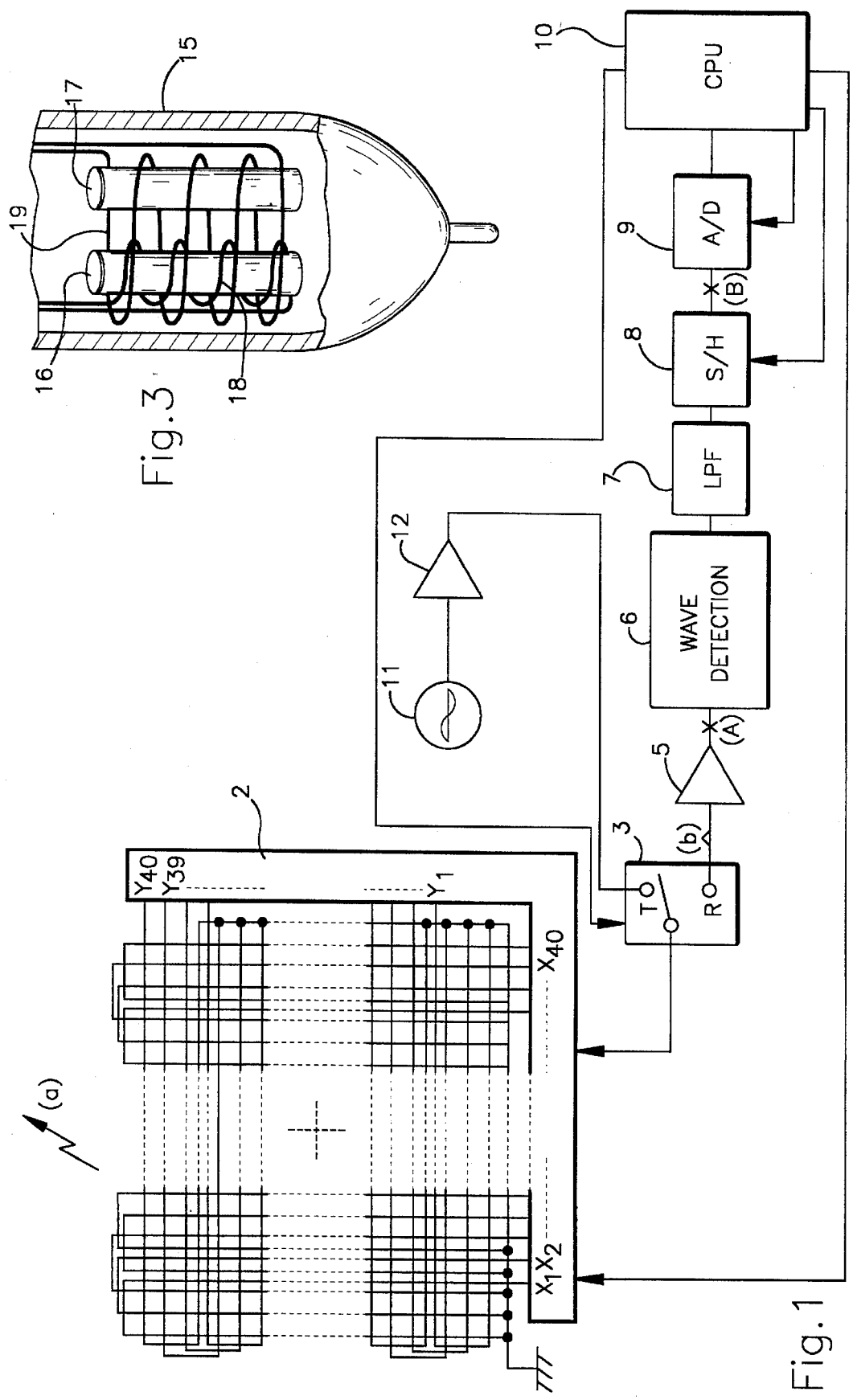
FIG. 1 is a circuit diagram showing an essential part of the tablet 1 as a position indicator according to the embodiments 1~3 of the present invention.

FIG. 1 is a schematic circuit diagram showing an essential part of the tablet 1 as a position detector according to the first embodiment. In other words, in FIG. 1, forty loop coils $X_1$-$X_{40}$ are arranged on the x-axis, while forty loop coils $Y_1$-$Y_{40}$ are arranged on the y-axis in parallel with the detection direction as is indicated in FIG. 1. The loop coils are connected to the selection circuit 2 which select respective loop coils. The selection circuit 2 is connected to the transmission/reception switching circuit 3, the reception side of which is connected to the amplifier 5, which is further connected to the detector circuit 6. The detector circuit 6 is connected to the low-pass filter 7, which is connected to the sample hold circuit 8, which is connected to the A/D circuit (analog/digital conversion circuit) 9, which is connected to the CPU (central processing unit) 10. A control signal from the A/D circuit 9 is connected to the selection circuit 2, sample hold circuit 8, A/D circuit 9 and transmission/reception switch circuit 3, respectively. The numeral 11 in FIG. 1 denotes a transmitter which generates a sinusoidal current signal having a frequency equal to the resonance frequency of the oscillation circuit of the position indicator, while the numeral 12 denotes a current driver which converts the sinusoidal current signal to an electric current.

Figure 2:
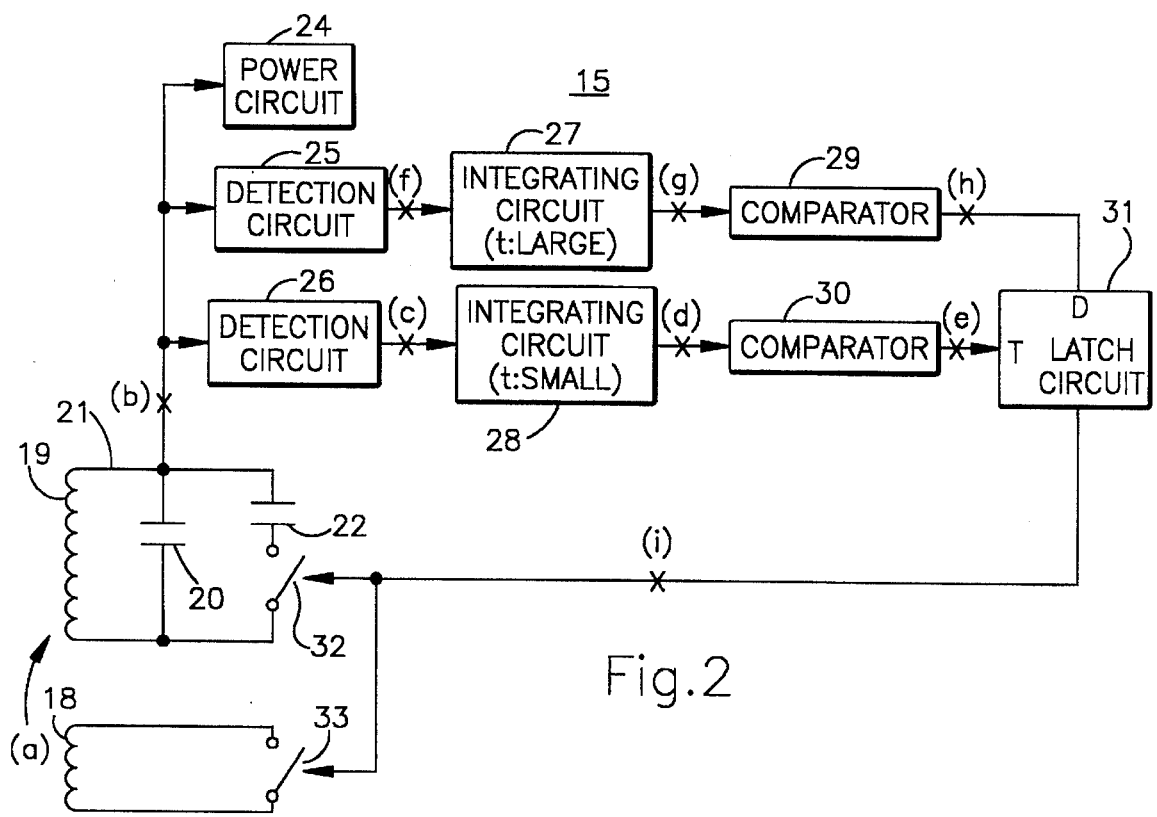
FIG. 2 is a circuit diagram showing an essential part of the position indicator according to the embodiment 1.

FIG. 2 is a schematic circuit diagram showing an essential part of the position indicator according to the first embodiment of the present invention.

FIG. 3 is an illustration for explaining the oscillation circuit part of the position indicator.

More specifically, two magnetic body cores 16 and 17 (ferrite is preferable; cores are not necessarily required) are arranged near the tip of the pen of the position indicator (in this embodiment, a position indicator is a pen-shaped position indicator) so that the intermediate point of the two magnetic body cores corresponds to the location of the tip of the pen. The coil 18 (hereinafter referred to as a control coil) is wound around only the magnetic body core 16, while the coil 19 (hereinafter referred to as a transmission coil) is wound around the magnetic body cores 16 and 17. This is a characteristic of the present invention.

The transmission coil 19 is connected to the condenser 20, which comprises the oscillation circuit 21. The oscillation circuit 21 is connected to the condenser 22 for compensation. The compensation condenser 22 is arranged to have certain capacity so that the resonance frequency of the oscillation circuit 21 coincides with the frequency of the transmission electromagnetic wave (transmission signal).

The oscillation circuit 21 is connected to the power circuit 24, detector circuit 25 and detector circuit 26, respectively. The detector circuit 25 is connected to the integrating circuit 27 having a large damping time constant, while the detector circuit 26 is connected to the integrating circuit 28 having a small damping time constant. The integrating circuit 27 is connected to the comparator 29, while the integrating circuit 28 is connected to the comparator 30. The comparator 29 is connected to the data terminal D of the latch circuit 31, and the comparator 30 is connected to the trigger terminal T of the latch circuit 31.

The condenser 22 connected to the oscillation circuit 21 is further connected to the switch 32 in series, while the control coil 18 is connected to the switch 33. The switches 32 and 33 are respectively connected to the output from the latch circuit 31.

The integrating circuit 27 and comparator 29 comprising the first path 34 which supplies its output to the data terminal D of the latch circuit 31 are designed in such a manner as to send an output signal when the transmission electromagnetic wave from the tablet 1 transmits the relationship between a time constant of the integrating circuit 27 and a reference value of the comparator 29 for a first predetermined time (in the present embodiment, a time sufficiently longer than 300 μs). On the other hand, the integrating circuit 28 and comparator 30 comprising the second pass 35 which supplies its output to the trigger terminal T of the latch circuit 31 are designed so as to send an output signal when the transmission electromagnetic wave from the tablet 1 transmits the relationship between a time constant of the integrating circuit 28 and a reference value of the comparator 30 for a second predetermined time which is shorter than the first predetermined time (in the present embodiment, a time sufficiently longer than 100 μs). The aforementioned first and second passes are one of the characteristics of the present invention.

Figure 4:
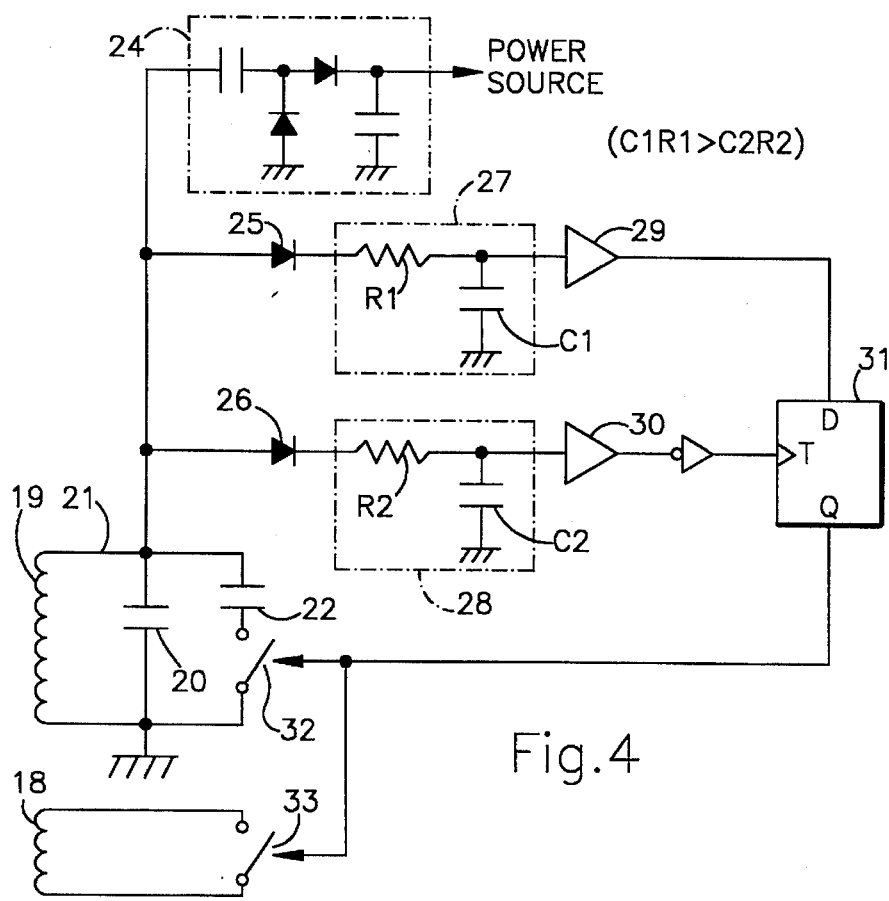
FIG. 4 is a specific circuit diagram of the position indicator.

FIG. 4 shows a more specific constitution of the circuit indicated in FIG. 2. The same referential numerals refer to the same components in FIGS. 2 and 4. The circuit is designed in such a manner that C1R1 is larger than C2R2.

Figure 5:
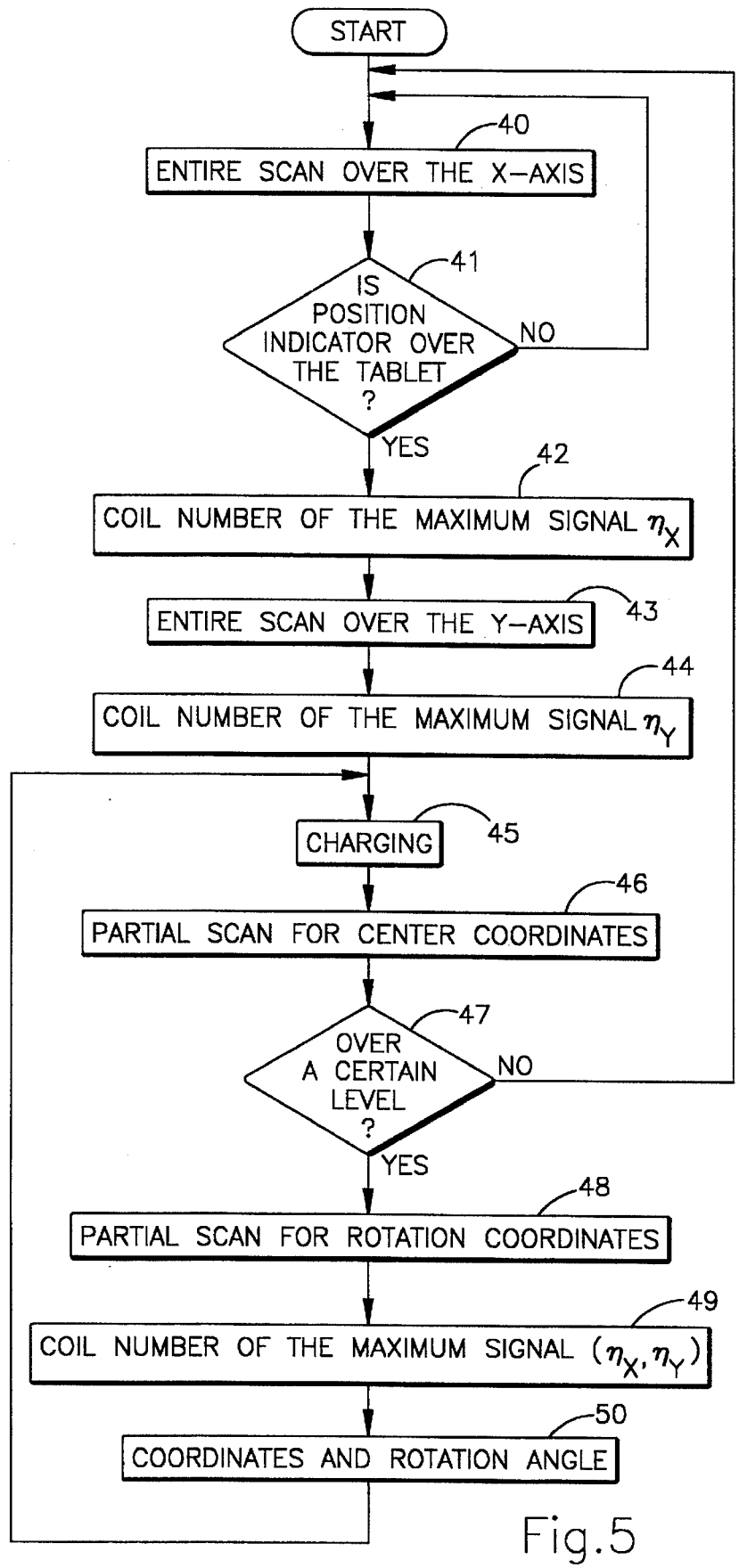
FIG. 5 is a flowchart of the operation control program stored in the CPU 10.
Figure 6:
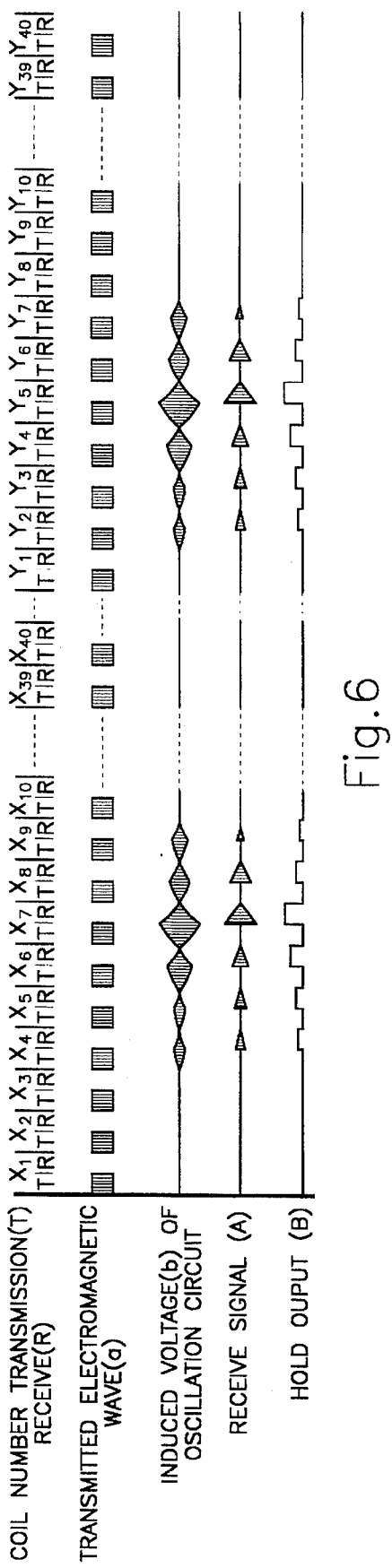
FIG. 6 is an output waveform indicating outputs of the points represented by the symbols X and Y.
Figure 9:
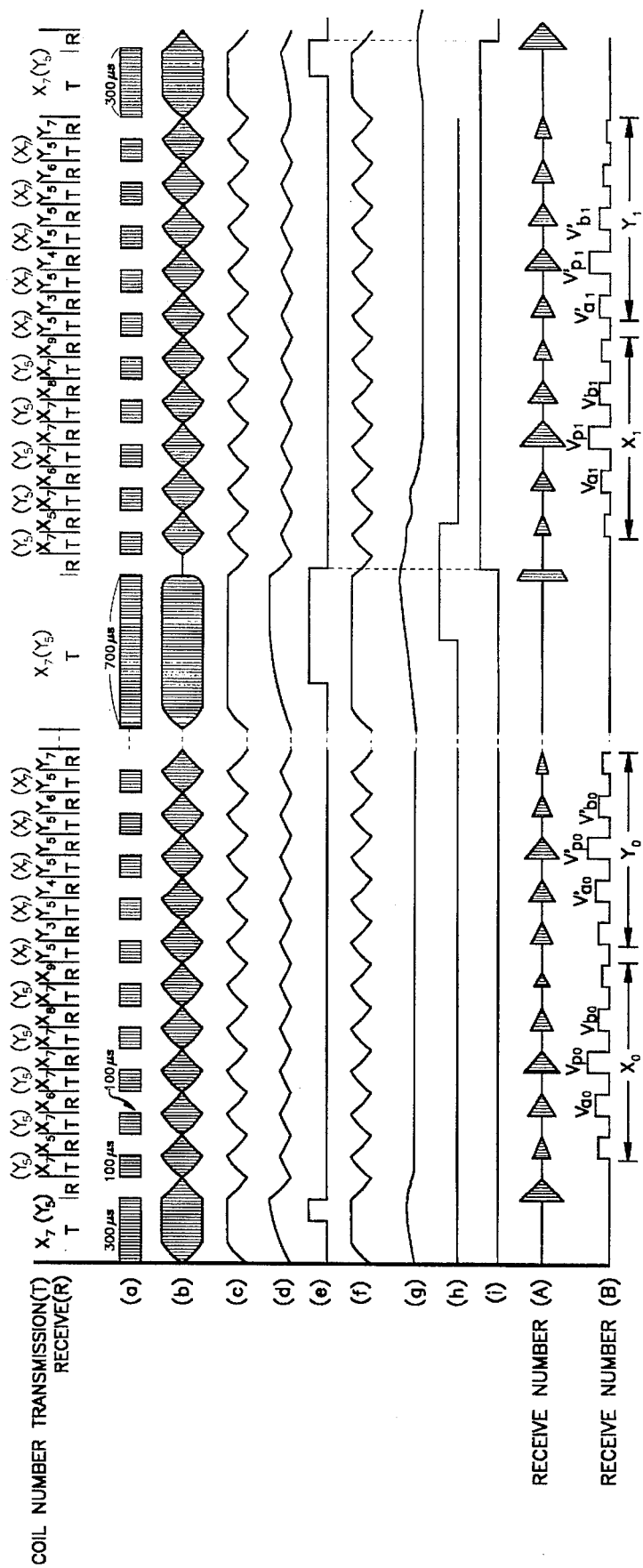
FIG. 9 is an output waveform indicating outputs of the points represented by the symbols X and Y.

FIG. 5 is a flowchart of an operation control program stored in the CPU 10.

In the drawings, the coil numbers denote the selected loop coils, while T and R respectively denote a transmission mode (a period of time for transmission from the position detector) and a reception mode (a period of time for reception by the position detector).

Hereinafter, an operation of the first embodiment of the present invention having the aforementioned constitution will be explained.

First, the entire X-axis is scanned in order to detect the position of the position indicator 15 on the tablet 1 (step 40). The scanning is conducted in the same manner as the conventional position detector.

The CPU 10 has the selection circuit 2 select the loop coil $X_1$ and connects the transmission/reception switch circuit 3 to the transmission side terminal T, so that a sinusoidal current signal from the transmitter 11 is provided to the loop coil $X_1$, whereby the loop coil $X_1$ transmits the transmit electromagnetic wave (a) of resonance frequency to the oscillation circuit 21 of the position indicator 15.

After the CPU 10 carries out the transmission mode for a predetermined time (for example T=100 μs), the selection circuit 2 switches the transmission/reception switch circuit 3 to the reception side while keeping the loop coil $X_1$, whereby the CPU 10 carries out a reception mode for receiving a signal from the position indicator 15 for a predetermined time (for example, R=100 μs).

The aforementioned operation is conducted on each of the loop coils $X_1$-$X_{40}$ in the X-axis direction as is indicated in FIG. 7, and the position of the position indicator 15 on the tablet 1 is determined from a loop coil selected when the received signal from the position indicator 15 becomes maximum.

On the other hand, the switches 32 and 33 in the position indicator 15 are open in the entire scanning mode, and the oscillation circuit 21 is excited by the transmit electromagnetic wave (a) to thereby generate induced voltage. In the reception mode, the transmit electromagnetic wave (a) is stopped. However, the transmission coil 19 generates an electromagnetic wave in response to the induced voltage and the thus generated electromagnetic wave excites the selected loop coil on the tablet 1, whereby an induced voltage is generated in the excited loop coil. Since the induced voltage becomes maximum at the loop coil closest to the position indicator 15, coordinates of the position indicator 15, that is, designated location of the position indicator 15 can be found.

The present embodiment refers to the case where the position indicator 15 indicates the locations of the loop coils $X_7$ and $X_5$. Thus, an entire scanning operation will be explained based on the case.

The CPU 10 repeats the transmission mode and reception mode for the respective loop coils, so that the selection circuit 2 selects the loop coil $X_7$. The transmit electromagnetic wave is sent from the loop coil $X_7$ to the position indicator 15. The oscillation circuit 21 of the position indicator 15 is excited by the transmit electromagnetic wave (a), whereby the induced voltage (b) is generated at the oscillation circuit 21. The tablet 1 enters the reception mode after the predetermined period of time and the transmit electromagnetic wave (a) is annihilated.

However, the induced voltage (b) causes the position indicator 15 to send out an electromagnetic wave until the induced voltage (b) attenuates, and the electromagnetic wave is received by the loop coil $X_7$. The loop coil $X_7$ is excited by the electromagnetic wave, whereby an induced voltage is generated at the loop coil $X_7$. The induced voltage is amplified by the amplifier 5. The received signal (A) amplified by the amplifier 5 is detected at the detection circuit 6 and is further sent out to the low-pass filter 7. The low-pass filter 7 has a cut-off frequency sufficiently lower than a resonance frequency of the oscillation circuit 21 and converts an output signal from the detection circuit 6 to a DC signal, which is sampled and held at the sample-and-hold circuit 7 like the signal (B) and is further subjected to analog/digital conversion to be sent out to the CPU 10. The CPU 10 detects the location of the position indicator 15 based on distribution of level of each of the thus digitalized received signals. In this embodiment, however, a level of the received signal from the loop coil $X_7$ becomes maximum, whereby the location of the position indicator 15 in relation to the X-axis is detected. The CPU 10 stores the loop coil $X_7$ as the position of the position indicator 15 in relation to the X-axis (step 42).

In the case where the levels of the received signals at the tablet 1 are all lower than threshold when the entire X-axis is scanned, the CPU 10 determines that the position indicator 15 is not on the tablet 1 and repeats the entire X-axis scanning (step 41).

The same operation as the entire X-axis scanning is conducted in relation to the Y-axis. In other words, as is indicated in FIG. 8, the entire Y-axis scanning is conducted in the same manner as the entire X-axis scanning and thereby, the CPU 10 stores the loop coil $Y_5$ as the position of the position indicator 15 on the tablet 1 in relation to the Y-axis direction (steps 43–44).

Once the No. of the coil on the tablet 1 (in the present embodiment, $X_7$ and $Y_5$) designated by the position indicator 15 is determined, a partial scanning is conducted on ten loop coils, five preceding the aforementioned designated coil and the remaining five following the same. The partial scanning is conducted to detect the location of the position indicator 15 on the tablet 1. In the case where the position indicator 15 is moved on the tablet 1, the locus thereof is detected from the partial scanning.

Figure 10:
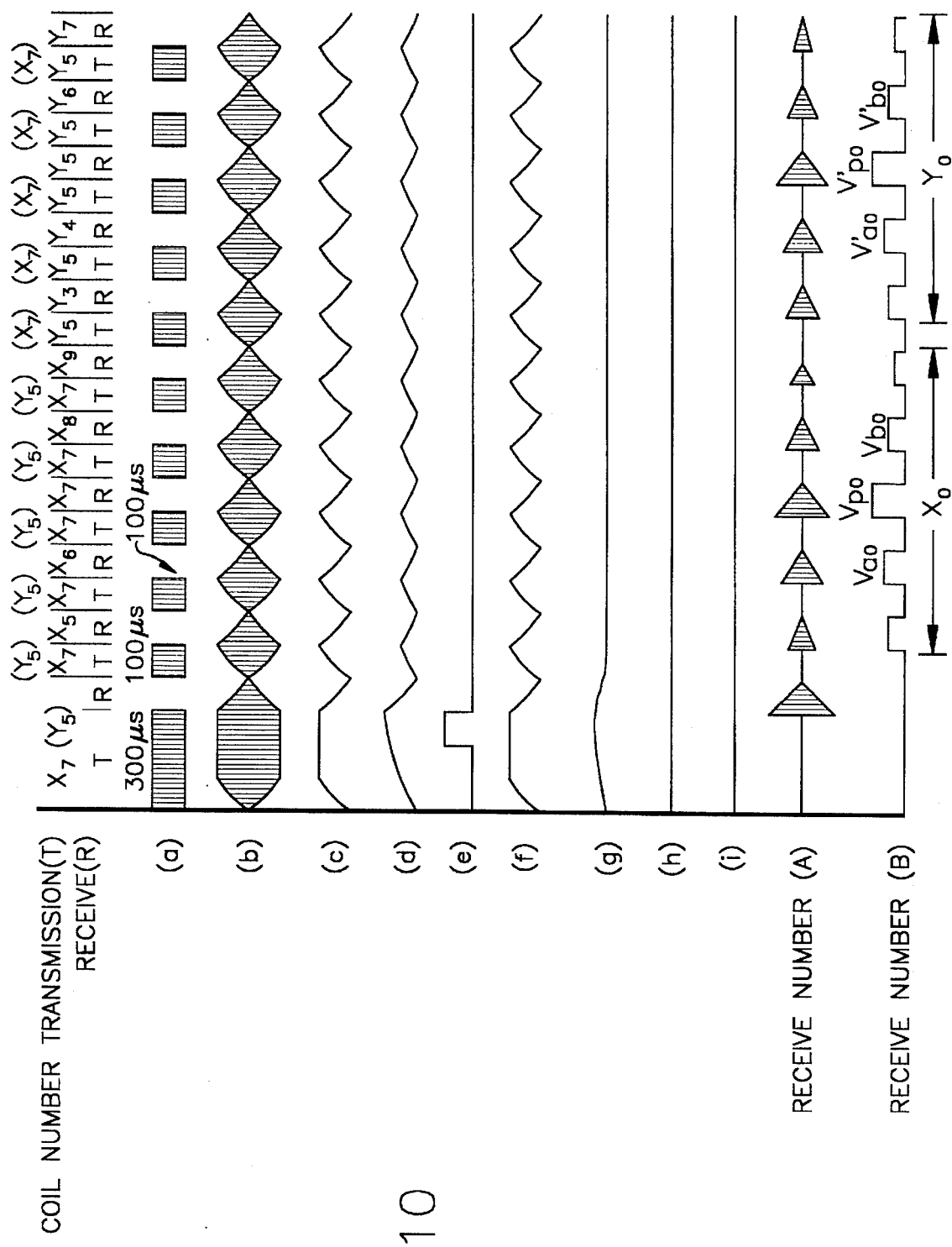
FIG. 10 is an enlarged fragmentary view of a portion of FIG. 9.

First, a charging operation starts (step 45). More specifically, the CPU 10 has the selection circuit 2 select the loop coil $X_7$ to thereby connect the transmission/reception switch circuit 3 to the transmission terminal T (FIG. 10). Under this condition the CPU 10 transmits the transmit electromagnetic wave (a) from the loop coil $X_7$ to the position indicator 15 for a predetermined period of time (in the present embodiment, T=300 μs). Thus, the induced voltage (b) is generated at the oscillation circuit 21 and then charges the power circuit 24. The induced voltage (b) is inputted to the detection circuits 25 and 26 respectively, and the detected outputs (f) and (c) are outputted from the detection circuits 25 and 26, respectively.

In response to the detected output (c), the second pass outputs the integrated output (d) and comparator output (e) as is indicated in the drawing. However, as the CPU 10 designates transmission time as 300 μs, the first pass 34 does not output the comparator output (h). This is one of the characteristics of the present invention.

After the transmission time T=300 μs for charging, the CPU 10 executed the next program, that is, a partial scanning (step 46) after a predetermined period of time for reception (in the present embodiment, R=100 μs) has passed.

The CPU 10 has the selection circuit 2 select the loop coil $X_7$ to thereby connect the transmission/reception switch circuit 3 to the transmission terminal T. Under this condition, the loop coil $X_7$ sends out the transmit electromagnetic wave (a) to the position indicator 15. The oscillation circuit 21 of the position indicator 15 is excited by the transmit electromagnetic wave (a), whereby the induced voltage (b) is generated at the oscillation circuit 21. The induced voltage (b) is detected at the detection circuits 25 and 26 respectively, which output the detected outputs (f) and (c) respectively. The detected output (c) is integrated at the integration circuit 28, and the thus integrated output (d) is compared with a reference value at the comparator 30. In the meantime, the integrated output (f) is integrated at the integration circuit 27 and the thus integrated output (g) is compared with a reference value at the comparator 29.

Since the transmission mode time by the CPU 10 is T=100 μs, the outputs (e) and (h) are not outputted from the first and second passes 34 and 35, and the output (i) is not outputted from the latch circuit 31 while the switches 32 and 33 remain open.

Under the condition where the switches 32 and 33 are kept open, the magnetic substance cores 16 and 17 generate a uniform AC magnetic field in response to the induced voltage (b) generated at the oscillation circuit 21. As a result, the center coordinates of the position indicator 15 on the tablet 1 are detected.

After the transmission mode time has passed, the CPU 10 has the selection circuit 2 select the loop coil $X_5$ to switch the transmission/reception switch circuit 3 to the reception terminal R side. In the reception mode of the loop coil $X_5$, the received signals (A) and (B) can be obtained by the same operation as is explained in the step 40.

In the transmission mode, the loop coil $X_7$ is selected, while the loop coils $X_6$, $X_7$, $X_8$ and $X_9$ are selected respectively in the reception mode and the aforementioned partial scanning operation is conducted on the loop coils successively (step 46).

The position indicator 15 indicates the loop coils $X_7$ and $X_5$ in the present embodiment as is mentioned above. Therefore, in the case of a partial scanning in the X-axis direction, the maximum received voltage $V_{p0}$ is obtained in the reception mode of the loop coil $X_7$, while the received voltages $V_{a0}$ and $V_{b0}$ are obtained in the reception mode of the loop coils preceding and succeeding $X_7$ respectively, that is, $X_6$ and $X_8$.

Following the partial scan in the X-axis direction, a partial scan in the Y-axis direction is conducted.

More specifically, the loop coil $Y_5$ is selected in the transmission mode, while the loop coils $Y_3$, $Y_4$, $Y_5$, $Y_6$ and $Y_7$ are respectively selected in the reception mode, whereby a partial scan in the Y-axis direction is conducted in the same manner as one in the X-axis direction (step 46).

In the Y-axis partial scan, the maximum received voltage $V'_{p0}$ is obtained in the reception mode of the loop coil $Y_5$, while the received voltages $V'_{a0}$ and $V'_{b0}$ are obtained in the reception mode of the loop coils $Y_4$ and $Y_6$.

The location of the position indicator 15 indicates the position corresponding to the intermediate position between the magnetic substance cores 16 and 17 (hereinafter, referred to as center coordinates $X_0$ and $Y_0$).

In the case where the received signal level is lower than a predetermined threshold level in the partial scan operation, the CPU 10 determines that the position indicator 15 is not on the tablet 1 and goes back to the process operation of the step 40 (step 47).

Figure 11:
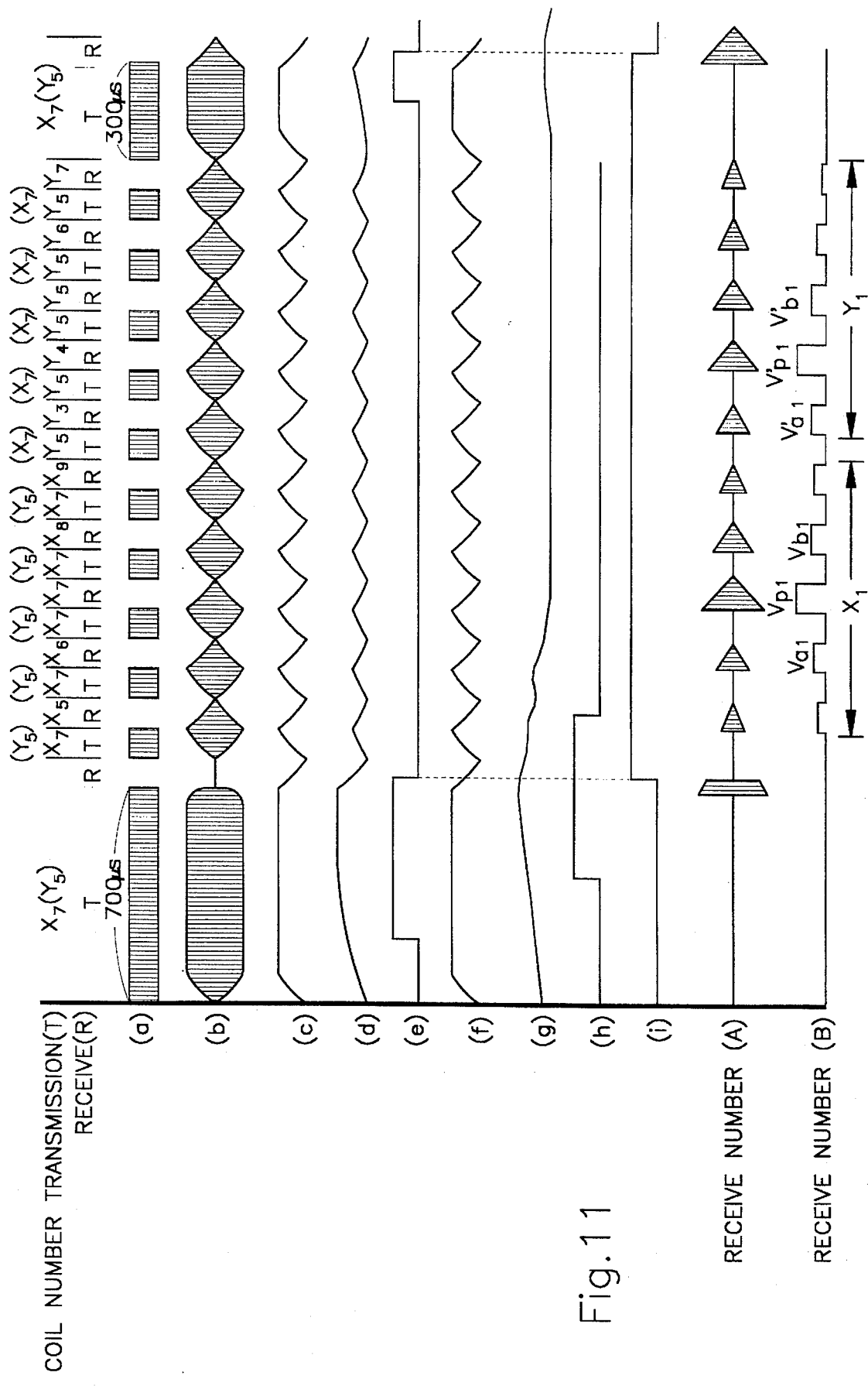
FIG. 11 is an enlarged fragmentary view of a portion of FIG. 9.
Figure 15:
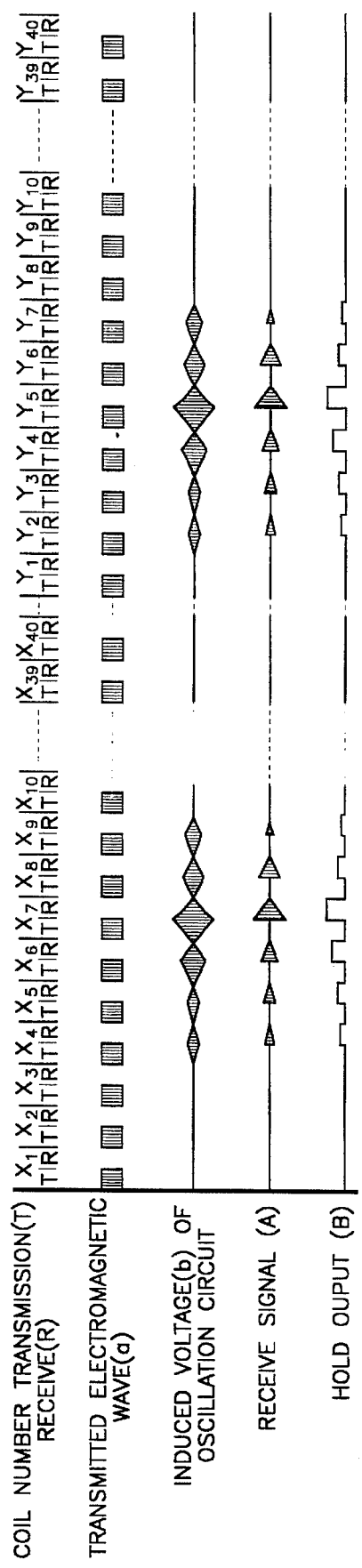
FIG. 15 is an output waveform indicating outputs of the points represented by the symbols X and Y.
Figure 18:
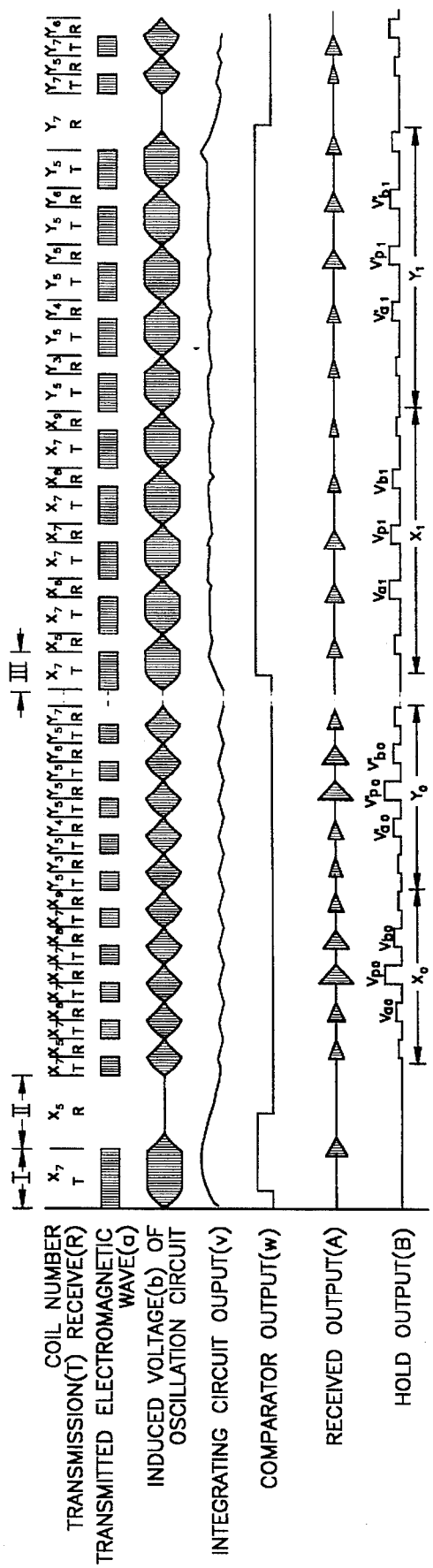
FIG. 18 is an output waveform indicating outputs of the points represented by the symbols X and Y in FIGS. 1 and 14.

Once the aforementioned partial scan for detecting the center coordinates in the X-axis direction and Y-axis direction (step 46) is complete, the CPU 10 short-circuits the control coil 18 and conducts a partial scan in order to find a rotation angle of the position indicator 15 (step 48, FIG. 11).

First, the CPU 10 transmits the transmit electromagnetic wave from the tablet 1 for a predetermined period of time (T=700 μs in the present embodiment) so that the control coil 18 is short-circuited.

More specifically, the CPU 10 has the selection circuit 2 select the loop coil $X_7$ to thereby connect the transmission/reception switch circuit 3 to the transmission terminal T. Under this condition, the CPU 10 transmits the transmit electromagnetic wave (a) to the position indicator 15 from the loop coil $X_7$ for a predetermined period of time (T=700 μs in the present embodiment). Thus, the induced voltage (b) is generated at the oscillation circuit 21. The induced voltage (b) is inputted to the detection circuits 25 and 26 respectively and thus, the detection circuits 25 and 26 output the detected outputs (f) and (c) respectively.

The second pass 35 is so designed as to output the comparator output (e) to the latch circuit 31 if the transmit electromagnetic wave (a) is sent to the second pass 35 for a period of time sufficiently longer than 100 μs (for example, after 200 μs has passed). Since the transmission time of the tablet 1 is 700 μs, the comparator output is outputted during this transmission period.

In response to the detected output (c), the integrated output (d) which rises at a predetermined time constant as is indicated in the drawing is outputted from the integration circuit 28, and when it surpasses a reference value of the comparator 30, the comparator output (e) is outputted as is indicated in the drawing.

The first pass 34 is designed in such a manner that the comparator output (h) is outputted to the latch circuit 31 if the transmit electromagnetic wave (a) is sent out for a period of time sufficiently longer than 300 μs (for example, after 400 μs has passed). Since the transmission time of the tablet 1 is 700 μs, the comparator output is outputted during this transmission period.

More specifically, in response to the detected output (f), the integrated output (g) which rises at a predetermined time constant as is indicated in the drawing is outputted from the integration circuit 27, and when it surpasses a reference value of the comparator 29, the comparator output (h) is outputted as is indicated in the drawing.

The latch circuit 31 operates in response to fall of the comparator output (e) and outputs the other comparator output (h) at this time as the latch output (i). The switches 32 and 33 are closed by the latch output (i).

After the transmission time T=700 μs for short-circuiting the control coil 18 has passed, the CPU 10 moves to the next step (step 48), that is, a partial scan for detecting the rotation angle after a predetermined reception time (R=100 μs in the present embodiment).

More specifically, the CPU 10 has the selection circuit 2 select the loop coil $X_7$ to thereby connect the transmission/reception switch circuit 3 to the transmission side terminal T. Under this condition, the loop coil $X_7$ sends out the transmit electromagnetic wave (a) to the position indicator 15. The oscillation circuit 21 of the position indicator 15 is excited by the transmit electromagnetic wave (a) to thereby generate the induced voltage (b) at the oscillation circuit 21.

Under the condition where the switches 32 and 33 are closed, the control coil 18 is short-circuited. Thus, it becomes difficult for an AC magnetic field to pass through the magnetic substance core 16 because of an eddy current which tries to run through the control coil 18. Therefore, a magnetic flux converges on the magnetic substance core 17, and an electromagnetic wave is sent out to the tablet 1 from the position of the magnetic substance core 17.

As a result, a position of rotation on the tablet 1 with the intermediate position of the position indicator 15 as a rotation axis is detected.

After the transmission mode time has passed, the CPU 10 has the selection circuit 2 select the loop coil $X_5$ to thereby switch the transmission/reception switch circuit 3 to the reception terminal R side. In the reception mode of the loop coil $X_5$, the received signals (A) and (B) are obtained on the tablet 1 by the same operation as explained in the step 40.

In the transmission mode, the loop coil $X_7$ is selected, while the loop coils $X_6$, $X_7$, $X_8$ and $X_9$ are respectively selected in the reception mode, and the partial scan operation is successively conducted (step 48).

Since the position indicator 15 indicates the loop coils $X_7$ and $X_5$ in the present embodiment, the maximum received voltage $V_{p1}$ is obtained in the reception mode of the loop coil $X_7$ in the partial scan in the X-axis direction, while the received voltages $V_{a1}$ and $V_{b1}$ are obtained in the reception mode of the loop coils $X_6$ and $X_8$ respectively.

Following the partial scan in the X-axis direction, a partial scan in the Y-axis direction is conducted.

More specifically, the loop coil $Y_5$ is selected in the transmission mode, while the loop coils $Y_3$, $Y_4$, $Y_5$, $Y_6$ and $Y_7$ are respectively selected in the reception mode, and a partial scan in the Y-axis direction is conducted in the same manner as the aforementioned partial scan in the X-axis direction (step 48).

During the partial scan in the Y-axis direction, the maximum received voltage $V'_{p1}$ is obtained in the reception mode of the loop coil $Y_5$, while the received voltages $V'_{a1}$ and $V'_{b1}$ are obtained in the reception mode of the loop coils $Y_4$ and $Y_6$ which respectively precede and succeed the loop coil $Y_5$.

The coordinates $(X_7, Y_5)$ of the position indicator 15 indicate the location of the magnetic substance core 17 (hereinafter referred to as the rotation coordinates $X_1, Y_1$).

The CPU 10 stores the loop coil Nos. at which the maximum voltages $V_{p0}$ and $V'_{p0}$ are detected by the partial scan (step 49). The thus stored loop coil Nos. are used to indicate the location of the position indicator 15 at the time of next partial scan so that a locus of the position indicator 15 on the tablet 1 is found.

Next, the CPU 10 performs an arithmetic operation to find coordinates and rotation angle (step 50).

The central coordinates $(X_0, Y_0)$ are found in the following manner.

$$X_0 = P_x + \frac{D_1}{2} \times \frac{V_{b0} - V_{a0}}{V_{p0} \times 2 - V_{a0} - V_{b0}}, \quad (1)$$

wherein $P_x$ denotes an intermediate position of the loop coil on the tablet at which the maximum voltage is obtained and $D_1$ denotes a distance between the intermediate positions of the loop coils in the X-axis direction.

$$Y_0 = P_y + \frac{D_2}{2} \times \frac{V_{b0}' - V_{a0}'}{V_{p0}' \times 2 - V_{a0}' - V_{b0}'}, \quad (2)$$

wherein $P_y$ denotes an intermediate position of the loop coil on the tablet at which the maximum voltage is obtained and $D_2$ denotes a distance between the intermediate positions of the loop coils in the Y-axis direction.

The rotation coordinates $(X_1, Y_1)$ are found in the following manner.

$$X_1 = P_x + \frac{D_1}{2} \times \frac{V_{b1} - V_{a1}}{V_{p1} \times 2 - V_{a1} - V_{b1}}, \quad (3)$$

wherein $P_x$ denotes an intermediate position of the loop coil on the tablet at which the maximum voltage is obtained and $D_1$ denotes a distance between the intermediate positions of the loop coils in the X-axis direction.

$$Y_1 = P_y + \frac{D_2}{2} \times \frac{V_{b1}' - V_{a1}'}{V_{p1}' \times 2 - V_{a1}' - V_{b1}'} \quad (4)$$

wherein $P_y$ denotes an intermediate position of the loop coil on the tablet at which the maximum voltage is obtained and $D_2$ denotes a distance between the intermediate positions of the loop coils in the Y-axis direction.

In the above Formulae 1–4, based on the intermediate coordinates of the loop coil at which the maximum voltage is obtained, maximum voltage detected at the loop coil and voltages detected at the loop coils preceding and following the loop coil, distribution of strength of received signals is approximated to the quadratic curve, based on which the center coordinates of the loop coil are interpolated.

FIG. 12 is a graph for explaining a principle of the aforementioned coordinates interpolation.

In FIG. 12, the X-axis represents an intermediate position of each coil, while the Y-axis represents a strength of received signals. Distribution of the received signals detected at the respective coils may be approximated to the quadratic curve as is indicated in the drawing, and $V_a$, $V_b$ and $V_p$ denote received detected voltages detected at the three coils. The symbol d denotes a distance between the coils, and the curve indicated in FIG. 12 can be represented by the following Formula 5 in which a, b and c are constants. The correction value b of the center coordinates of the loop coil at which the maximum voltage is obtained is found from the Formula (5).

$$y = a(x-b)^2 + c \quad (5),$$

wherein y is equal to $V_p$, $V_a$ and $V_b$ when x is equal to 0, −d and d respectively and therefore, $$V_a = a(-d-b)^2 + c = ad^2 + 2abd + ab^2 + c \quad (6)$$

$$V_p = ab^2 + c \quad (7)$$

$$V_b = a(d-b)^2 + c = ad^2 - 2abd + ab^2 + c \quad (8)$$

From (6)–(7), $$V_a - V_p = ad^2 + 2abd = ad(d+2b) \quad (9)$$

From (8)–(7), $$V_b - V_p = ad^2 - 2abd = ad(d-2b) \quad (10)$$

From (9) and (10), $$(V_a-V_p)/(V_b-V_p) = (d+2b)/(d-2b)$$

The above formula is expanded, so that the correction value b is represented by the following formula.

$$b = [d(V_b-V_a)]/[2(2V_p-V_a-V_b)]$$

From the principle of measurement of rotation angle indicated in FIG. 13 based on the coordinates, the CPU 10 detects a rotation angle of the position indicator 15.

More specifically, the X and Y coordinate systems parallel to the X- and Y-axes on the tablet 1 respectively are set, wherein the detected center coordinates represent an origin and the scope of $\theta$ is $-180° < \theta \leq +180°$ with the positive direction of the Y-axis as a reference ($\theta=0$). Thus, the rotation angle is found in the following manner (step 50).

When $Y_1 > Y_0$, $$\theta = \tan^{-1}\left(\frac{X_1 - X_0}{Y_1 - Y_0}\right) \quad (11)$$

When $Y_1 = Y_0$, $X_1 > X_0$ $$\theta = 90° \quad (12)$$

When $Y_1 = Y_0$, $X_1 < X_0$ $$\theta = -90° \quad (13)$$

When $Y_1 < Y_0$, $X_1 \geq X_0$ $$\theta = 180° + \tan^{-1}\left(\frac{X_1 - X_0}{Y_1 - Y_0}\right) \quad (14)$$

When $Y_1 < Y_0$, $X_1 < X_0$ $$\theta = -180° + \tan^{-1}\left(\frac{X_1 - X_0}{Y_1 - Y_0}\right) \quad (14)$$

When the CPU 10 finishes the step 50, the transmit electromagnetic wave (a) of 300 μs is sent out from the tablet 1. In response to the transmit electromagnetic wave (a), the first pass 34 and second pass 35 operate in the same manner as mentioned above and the latch circuit 31 is reset, whereby the aforementioned steps 45–50 are repeated.

Next, the second embodiment of the present invention will be explained by way of the drawing.

The second embodiment relates to a simplified version of the position indicator of the embodiment 1. Apart from the fact that the indicator of the embodiment 2 has a simpler constitution than that of the embodiment 1, the indicators are basically the same.

FIG. 14 is a schematic circuit diagram showing an essential part of the position indicator 56 according to the second embodiment.

In FIG. 14, the numeral 57 denotes a detection circuit; 58 an integrating circuit comprising the condenser $C_3$ and resistor $R_3$; 59 a comparator.

A time constant of the integrating circuit 58 and reference voltage of the comparator 59 have such a relationship that when a transmission time of the transmit electromagnetic wave from the tablet 1 is sufficiently longer than 100 μs (for example, 150 μs–200 μs), a comparator output is outputted from the comparator 59. This is one of the characteristics of the present invention.

Since the indicator of the embodiment 2 is the same as that of the embodiment 1 indicated in FIG. 2 in other respects, the same referential numerals denote the same components in FIGS. 2 and 14.

FIGS. 1, 3 and 4 apply to both the embodiment 1 and embodiment 2.

Further, the coil numbers in the drawings refer to the selected loop coils, and T and R respectively denote a transmission mode (period of time for transmission from a position indicator) and reception mode (period of time for reception by a position indicator).

Hereinafter, an operation of the indicator according to the second embodiment having the aforementioned constitution will be explained.

First, an entire scan for detecting where the position indicator 56 is placed on the tablet 1 is conducted (step 40). The entire scan is conducted in the same manner as the embodiment 1.

By referring to FIG. 16, the CPU 10 has the selection circuit 2 select the loop coil $X_1$ to thereby connect the transmission/reception switch circuit 3 to the transmission side terminal T to further provide the loop coil $X_1$ with a sinusoidal current signal of the transmitter 11. Thereby, the transmit electromagnetic wave (a) of a resonant frequency is transmitted from the loop coil $X_1$ to the oscillation circuit 21 of the position indicator 56.

After the CPU 10 carries out the transmission mode for a predetermined period of time (for example, T=100 μs), the selection circuit 2 switches the transmission/reception switch circuit 3 to the receive side while the loop coil $X_1$ is maintained as it is, whereby the reception mode for receiving signals from the position indicator 56 for a predetermined period of time (for example, R=100 μs) is carried out.

By performing the aforementioned operation on all the loop coils $X_1$–$X_{40}$ in the X-axis direction and finding which loop coil causes a received signal from the position indicator 56 to become maximum, it is determined where the position indicator 56 is located on the tablet 1.

On the other hand, the switches 32 and 33 are open when the position indicator 56 is in the entire scan mode, and the oscillation circuit 21 is excited by the transmit electromagnetic wave (a) to generate an induced voltage. In the reception mode, the transmit electromagnetic wave (a) is halted. However, an electromagnetic wave is generated from the transmission coil 19 by the induced voltage and the thus generated electromagnetic voltage excites the loop coil selected on the tablet 1, whereby an induced voltage is generated in the loop coil. The thus generated induced voltage becomes maximum at the loop coil closest to the position indicator 56 and thereby, coordinates of the position indicator 56, that is, the designated location of the position indicator 56 can be found.

The present embodiment pertains to the case where the position indicator 56 indicates the locations of the loop coils $X_7$ and $Y_5$. Hereinafter, an entire scan operation will be explained based on the case.

The CPU 10 repeats the transmission mode and reception mode on every loop coil and has the selection circuit 2 select the loop coil $X_7$. The transmit electromagnetic wave (a) is transmitted from the loop coil $X_7$ to the position indicator 56. The oscillation circuit 21 of the position indicator 56 is excited by the transmit electromagnetic wave (a), while the induced voltage (b) is generated at the oscillation circuit 21. After the predetermined period of time has passed, the tablet 1 enters the reception mode and the transmit electromagnetic wave (a) is annihilated.

However, an electromagnetic wave is sent out from the position indicator 56 by the induced voltage (b) until the induced voltage (b) attenuates, and the thus sent-out electromagnetic wave is received by the loop coil $X_7$. The loop coil $X_7$ is excited by the electromagnetic wave, whereby an induced voltage is generated at the loop coil $X_7$ and the thus generated induced voltage is amplified by the amplifier 5. The received signal (A) amplified at the amplifier 5 is detected at the detection circuit 6 and is further sent out to the low-pass filter 7. The low-pass filter 7 has a cutoff frequency sufficiently lower than the resonant frequency of the oscillation circuit 21 and converts an output signal from the detection circuit 6 to a DC signal, which is sampled and held at the sample-hold circuit 7 like the signal (B), subjected to analog/digital conversion by the A/D circuit 9 and sent out to the CPU 10. Although the CPU 10 detects the location of the position indicator 56 on the basis of distribution of the level of the respective digitalized received signals, the level of the received signal from the loop coil $X_7$ becomes maximum in the present embodiment, whereby the location of the position indicator 56 in the X-axis direction can be found. The CPU 10 stores the loop coil $X_7$ as the location of the position indicator 56 in the X-axis direction (step 42).

In the case where the levels of the received signals at the tablet 1 are all lower than the predetermined threshold level during the entire X-axis scan, the CPU 10 decides that the position indicator 56 is not on the tablet 1 and repeats the entire X-axis scan (step 41).

The same operation as the X-axis entire scan is performed in the Y-axis direction. That is, the entire Y-axis scan is conducted in the same manner as the X-axis entire scan as is indicated in FIG. 17, and the CPU 10 stores the loop coil $Y_5$ as the location of the position indicator 56 on the tablet 1 in the Y-axis direction (steps 43–44).

After the coil Nos. indicated by the position indicator 56 on the tablet 1 are determined ($X_7$ and $Y_5$ in the present embodiment), a partial scan is performed on the five loop coils preceding $X_7$ and $Y_5$ respectively and other five loop coils succeeding $X_7$ and $Y_5$ respectively. The partial scan is conducted in order to detect the location of the position indicator 56 placed on the tablet 1. More specifically, it detects the locus of the position indicator 56 in the case where the position indicator 56 is moved on the tablet 1.

Figure 19:
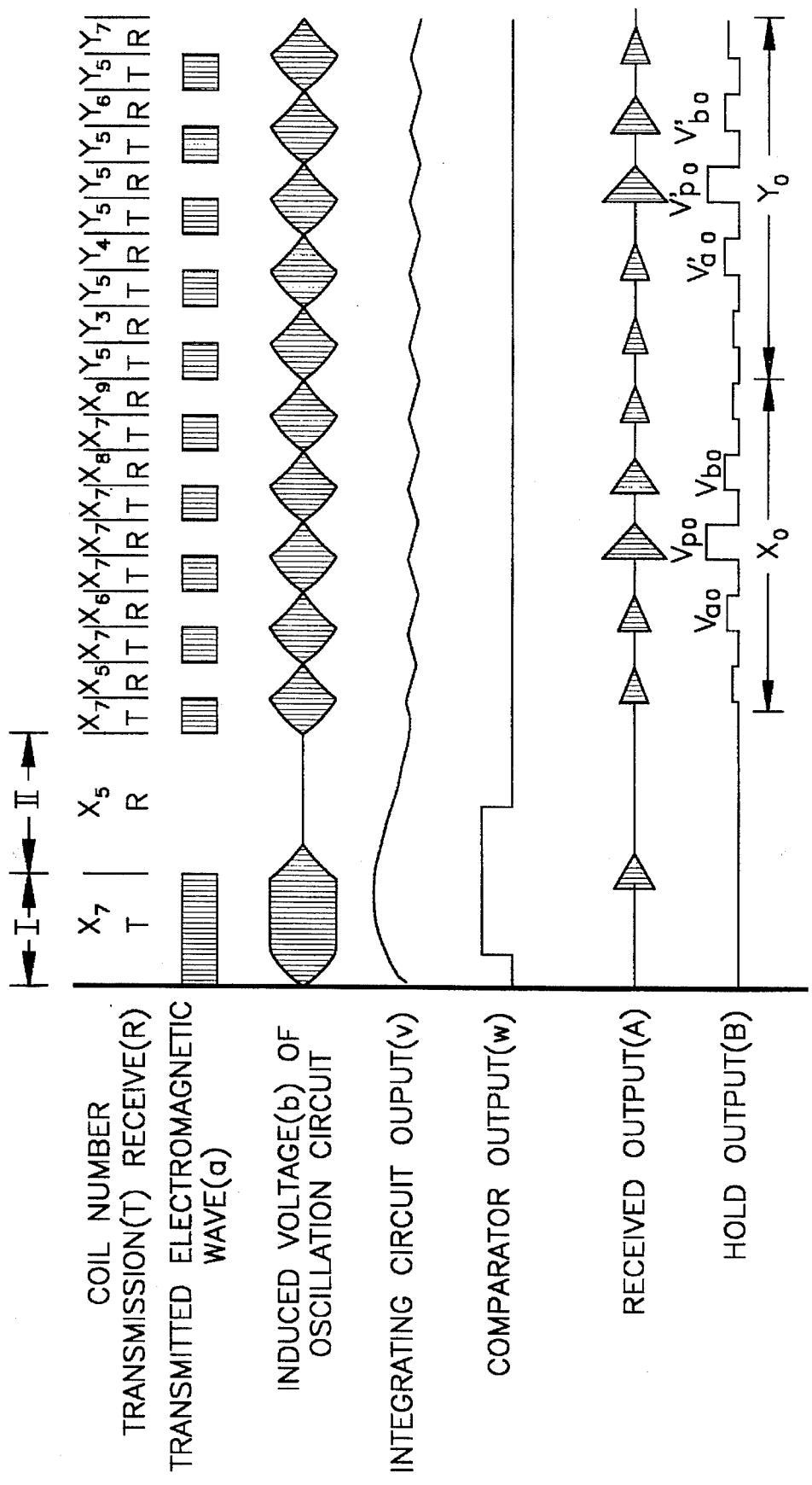
FIG. 19 is an enlarged fragmentary view of a portion of FIG. 18.

First, a charging operation starts (step 45). That is, the CPU 10 has the selection circuit 2 select the loop coil $X_7$ to thereby connect the transmission/reception switch circuit 3 to the transmission terminal T side (FIG. 19).

Under this condition, the CPU 10 transmits the transmit electromagnetic wave (a) from the loop coil $X_7$ to the position indicator 56 for a predetermined period of time (in the present embodiment, T=300 μs, FIG. 19, I), whereby the induced voltage (b) is generated at the oscillation circuit 21 and the thus generated induced voltage (b) charges the charging circuit 24. The induced voltage (b) is inputted to the detection circuit 57, from which a detected output is outputted. In response to the detected output, the integrated output (v) is outputted from the integrating circuit 58, while the comparator output (w) is outputted from the comparator 59 as is indicated in the drawings. However, after the transmission time 300 μs has passed, the CPU 10 switches the transmission/reception switch circuit 3 to the receive terminal R to halt transmission of the transmitted electromagnetic wave (a), while the tablet 1 enters the reception mode to be in the mode for 300 μs (FIG. 19, II). Given the reception mode, the induced voltage (b) of the position indicator 56 attenuates and the comparator output (w) is also turned off. Thereby, the closed switches 32 and 33 are opened, which is one of the characteristics of the present invention.

After the transmission time of T=300 μs for charging has passed, the CPU 10 moves on to the next step, that is, a partial scan after the predetermined reception time of R=300 μs (step 46).

The CPU 10 has the selection circuit 2 select the loop coil $X_7$ to connect the transmission/reception switch circuit 3 to the transmission side terminal T. In this condition, the loop coil $X_7$ sends the transmit electromagnetic wave (a) to the position indicator 56. The transmit electromagnetic wave (a) excites the oscillation circuit 21 and the induced voltage (b) is generated at the oscillation circuit 21. The induced voltage (b) is detected at the detection circuit 57, and the detected output is integrated at the integrating circuit 58. The integrated output (v) is compared with a reference value at the comparator 59.

The transmission mode period by the CPU 10 in the case of the partial scan is T=100 μs. Therefore, the comparator output (v) is not outputted from the comparator 59 and thus, the switches 32 and 33 remain open.

While the switches 32 and 33 are open, the induced voltage (b) generated at the oscillation circuit 21 generates a uniform AC magnetic field from the magnetic substance cores 16 and 17. As a result, the intermediate position of the position indicator 56 on the tablet 1 is detected.

After the transmission time has passed, the CPU 10 has the selection circuit 2 select the loop coil $X_5$ and switches the transmission/reception switch circuit 3 to the reception terminal R side. In the reception mode of the loop coil $X_5$, the received signals (A) and (B) are obtained on the tablet 1 by the same operation as explained in the step 40.

The partial scan operation selects the loop coil $X_7$ in the transmission mode, while the loop coils $X_6$, $X_7$, $X_8$ and $X_9$ are successively selected in the reception mode (step 46).

As mentioned before, the position indicator 56 indicates the loop coils $X_7$ and $Y_5$. Therefore, the maximum received voltage $V_{p0}$ is obtained in the reception mode of the loop coil $X_7$ during the partial scan in the X-axis direction, while the received voltages $V_{a0}$ and $V_{b0}$ are obtained in the reception mode of the loop coils $X_6$ and $X_8$.

A partial scan in the Y-axis direction is conducted after the partial scan in the X-axis direction.

More specifically, the loop coil $Y_5$ is selected in the transmission mode, while the loop coils $Y_3$, $Y_4$, $Y_5$, $Y_6$ and $Y_7$ are selected in the reception mode, whereby a partial scan in the Y-axis direction is conducted in the same manner as the partial scan in the X-axis direction (step 46).

During the partial scan in the Y-axis direction, the maximum received voltage $V'_{p0}$ is obtained in the reception mode of the loop coil $Y_5$, while the received voltage $V'_{a0}$ and $V'_{b0}$ are obtained in the reception mode of the loop coils $Y_4$ and $Y_5$.

The location of the position indicator 56 corresponds to the intermediate position (hereinafter, central coordinates $X_0$, $Y_0$) of the magnetic substance cores 16 and 17.

If the level of the received signal is lower than a predetermined threshold level during the partial scan operation, the CPU 10 decides that the position indicator 56 is not on the tablet 1 and goes back to the step 40 (step 47).

Figure 20:
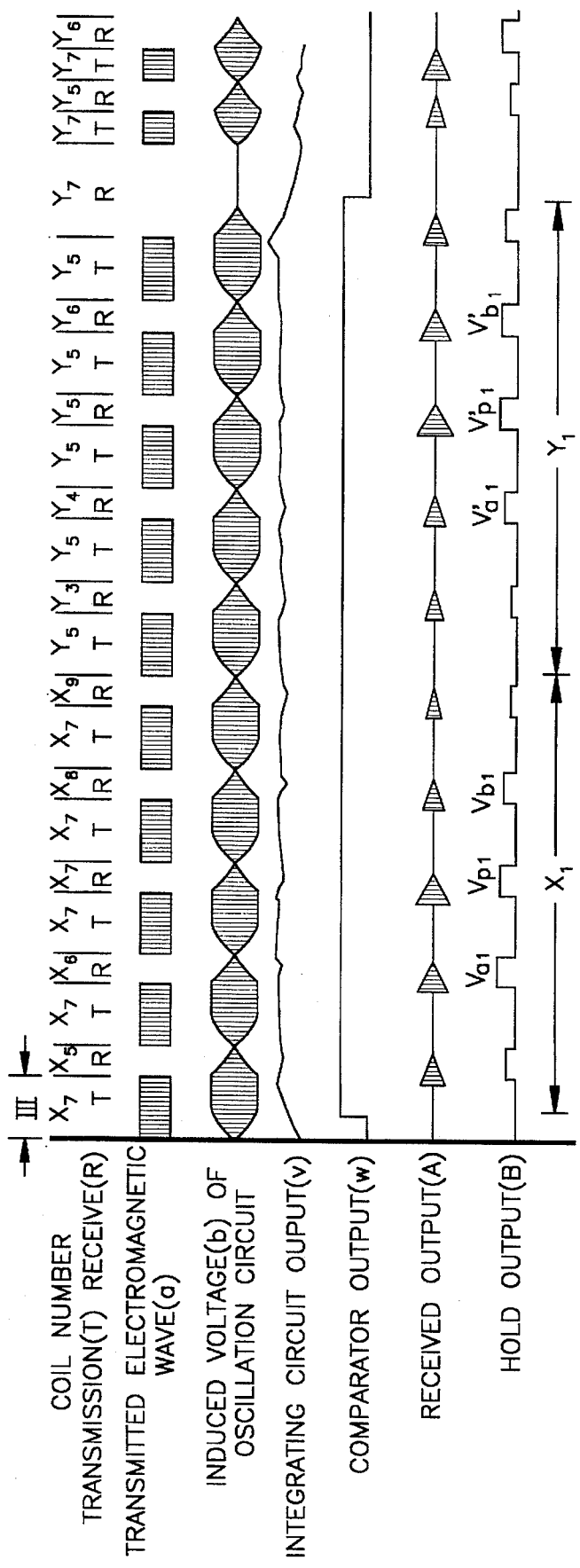
FIG. 20 is an enlarged fragmentary view of a portion of FIG. 18.

When the CPU 10 finishes the partial scan for detecting the intermediate positions in the X-axis direction and Y-axis direction (step 46), the control coil 18 is short-circuited to conduct a partial scan for finding a rotation angle of the position indicator 56 (step 48, FIG. 20).

First, the CPU 10 transmits the transmit electromagnetic wave from the tablet 1 for a predetermined time (T=300 μs, FIG. 20, III) to short-circuit the control coil 18.

More specifically, the CPU 10 has the selection circuit 2 select the loop coil $X_7$ to connect the transmission/reception switching circuit 3 to the transmission terminal T side. In this condition, the CPU 10 transmits the transmit electromagnetic wave (a) to the position indicator 56 from the loop coil $X_7$ for a predetermined period of time (in the present embodiment, T=300 μs, FIG. 20, III). Thereby, the induced voltage (b) is generated at the oscillation circuit 21. The induced voltage (b) is inputted to the detection circuit 57, in response to which a detected output is outputted. In response to the detected output, the integrating circuit 58 outputs an integrated output (v) which rises at a predetermined time constant, and when the integrated output surpasses a reference value of the comparator 59, the comparator output (w) is outputted as is indicated in the drawings. The switches 32 and 33 are closed by the comparator output (w).

After the transmission mode time has passed, the CPU 10 has the selection circuit 2 select the loop coil $X_5$ to thereby connect the transmission/reception switching circuit 3 to the reception terminal R side.

The CPU 10 carries out the reception mode of the reception time R=100 μs.

In the reception mode of the loop coil $X_5$, the received signals (A) and (B) are obtained on the tablet 1 in the same operation as explained in the step 40.

Since the switches 32 and 33 are closed, an electromagnetic wave is sent out to the tablet 1 from the location of the magnetic substance core 17 by the induced voltage (b) generated at the oscillation circuit 21 during the rotation coordinates partial scan. As a result, the location of the rotation with the intermediate position of the position indicator 56 as an axis on the tablet 1 is detected.

Furthermore, as the reception time is set to be R=100 μs, the next transmission mode is carried out before the output (v) from the integrating circuit 58 attenuates. The comparator output (w) maintains an output as is indicated in the drawing, and the switches 32 and 33 remain closed.

The partial scan operation selects the loop coil $X_7$ in the transmission mode, while in the reception mode the loop coils $X_6$, $X_7$, $X_8$ and $X_9$ are successively selected (step 48).

As is mentioned above, since the position indicator 56 indicates the loop coils $X_7$ and $Y_5$ in the present embodiment, the maximum voltage $V_{p1}$ is obtained in the reception mode of the loop coil $X_7$ in the partial scan in the X-axis direction, while the received voltages $V_{a1}$ and $V_{b1}$ are obtained in the reception mode of the loop coils $X_6$ and $X_8$.

Following the partial scan in the X-axis direction, the partial scan in the Y-axis direction is conducted.

More specifically, in the transmission mode the loop coil $Y_5$ is selected, while the loop coils $Y_3$, $Y_4$, $Y_5$, $Y_6$ and $Y_7$ are selected in the reception mode, so that the partial scan in the Y-axis direction is carried out in the same manner as the partial scan in the X-axis direction (step 48).

During the partial scan in the Y-axis direction, the maximum received voltage $V'_{p1}$ is obtained in the reception mode of the loop coil $Y_5$, while the received voltages $V'_{a1}$ and $V'_{b1}$ are respectively obtained in the reception mode of the loop coils $Y_4$ and $Y_6$.

When the CPU 10 carries out the reception mode of the loop coil $Y_7$ at the end of the partial scan in the Y-direction, the reception time R is made to be 300 µs. During the last reception mode, the integrated output (v) decreases and the comparator output (w) is turned off. Thereby, the switches 32 and 33 are opened.

The coordinates $(X_7, Y_5)$ of the position indicator 56 represent the location of the magnetic substance core 17 (hereinafter referred to as rotation coordinates $X_1, Y_1$).

The CPU 10 stores the loop coil Nos. of the loop coils at which the maximum voltages $V_{p0}$ and $V'_{p0}$ are detected during the partial scan (step 49). The thus stored loop coil Nos. are used to indicate the location of the position indicator 56 at the time of the next partial scan in order to find the locus of the position indicator 56 on the tablet 1.

Next, the coordinates are obtained from the Formulae (1)~(4) in the same manner as in the Embodiment 1, and the rotation angle is obtained from the Formulae (11)~(15) (step 50).

When the CPU 10 finishes the step 50, it moves to the processing step of a partial scan for detecting an intermediate position to repeat the above operation.

Next, the third embodiment of the present invention will be explained by way of drawings.

In the third embodiment, the position indicator described in FIG. 1 is employed.

Figure 21:
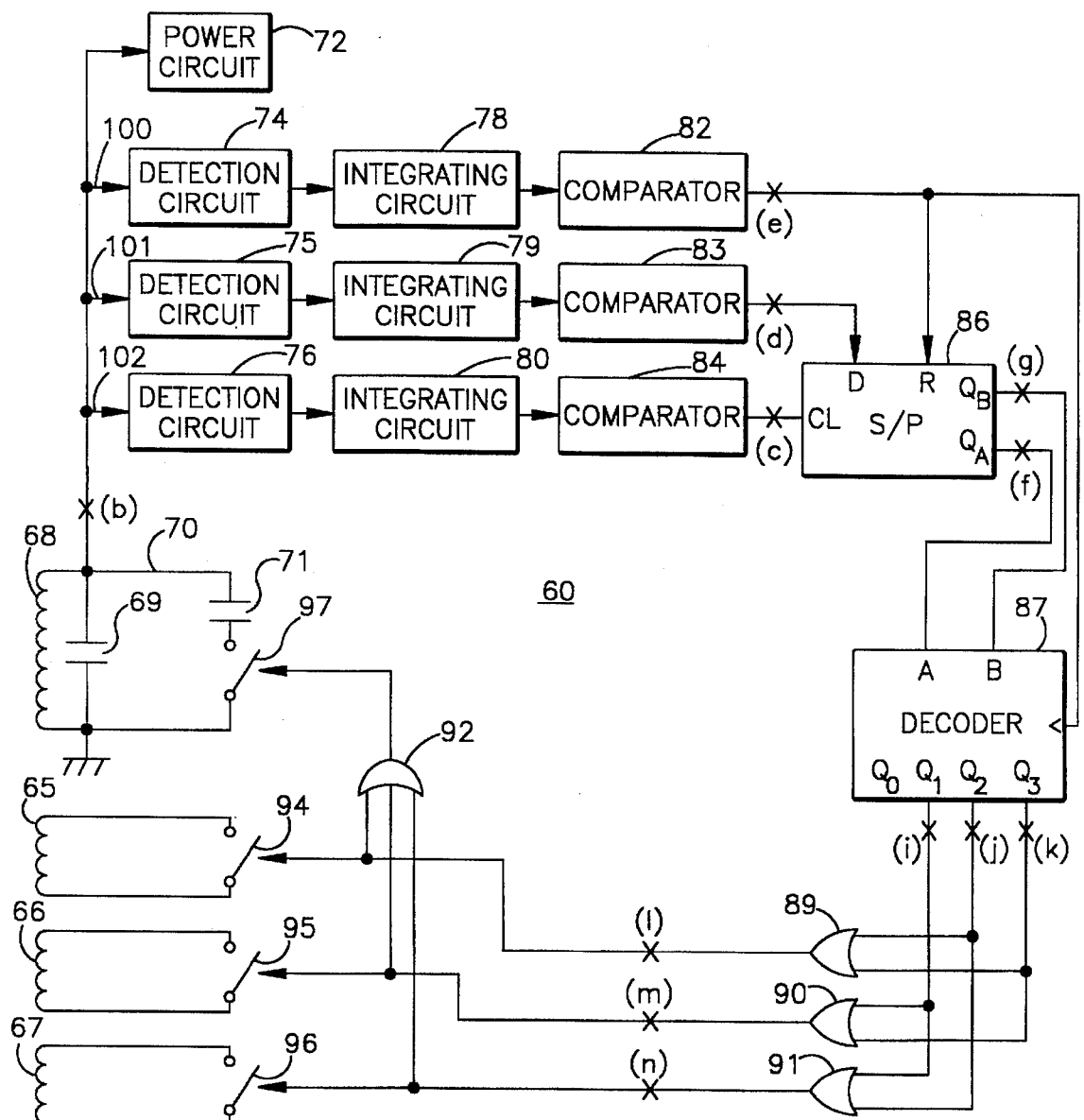
FIG. 21 is a circuit diagram showing an essential part of the position indicator of the embodiment 3 of the present invention.

FIG. 21 is a circuit diagram showing an essential part of the position indicator according to the third embodiment of the present invention.

Figure 22:
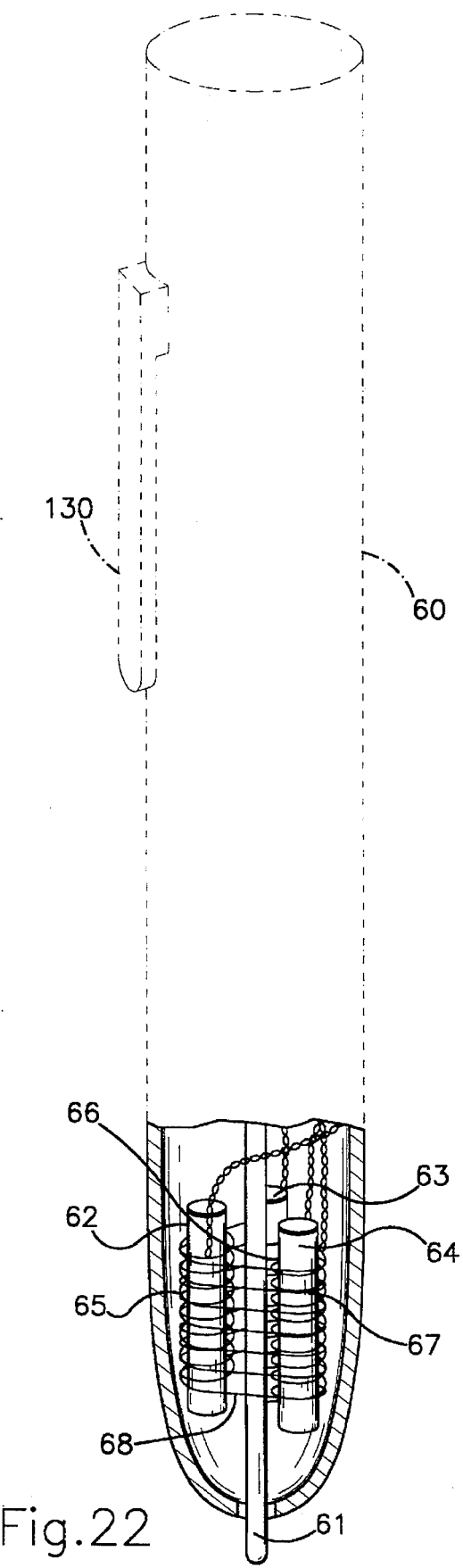
FIG. 22 is an illustration for explaining an oscillation circuit part of the position indicator.

FIG. 22 is an illustration for explaining the oscillation circuit part of the position indicator.

More specifically, three magnetic substance cores 62, 63 and 64 (ferrite material is preferable; cores are not necessarily required) are arranged near the pen tip 61 of the position indicator (referring to a pen-shaped position indicator in this embodiment) in such a manner that the intermediate position of the three magnetic substance cores 62, 63 and 64 corresponds to the location of the pen tip. The coils 65, 66 and 67 are wound around the magnetic substance cores 62~64, respectively (hereinafter referred to as a control coil) and furthermore, the coil 68 (hereinafter referred to as a transmission coil) is wound around the three magnetic substance cores 62~64, which is one of the characteristics of the present invention.

The condenser 69 is connected to the transmission coil 68, which comprises the oscillation circuit 70. The compensating condenser 71 is connected to the oscillation circuit 70 as is indicated in the drawing. The capacity of the compensating condenser 71 is selected in such a manner that the frequency of the transmit electromagnetic wave (transmitted signal) coincides with the resonance frequency of the oscillation circuit 70, while two of the three control coils are closed.

The oscillation circuit 70 is connected to the charging power source 72 and detection circuits 74, 75 and 76. The detection circuits 74, 75 and 76 are respectively connected to the integrating circuit 78 having a large time constant, integrating circuit 79 having a medium time constant and integrating circuit 80 having a small time constant. The integrating circuits 78, 79 and 80 are respectively connected to the comparators 82, 83 and 84. The comparators 82, 83 and 84 are respectively connected to the reset terminal R, data terminal D and clock terminal CL of the serial/parallel conversion circuit 86.

The $Q_A$ output and $Q_B$ output from the serial/parallel conversion circuit 86 are respectively connected to the input terminals A and B of the decoder (binary to decimal decoder) 87. The $Q_1$ output from the decoder 87 is connected to one side of the OR circuits 90 and 91, and the $Q_2$ output is connected to the other side of the OR circuit 91 and OR circuit 89 and $Q_3$ output is connected to the other side of the OR circuits 89 and 90. The outputs from the OR circuits 89, 90 and 91 are connected to the control coils 65, 66 and 67 to be further connected to the switches 94, 95 and 96 respectively for opening/closing and controlling them.

The outputs from the OR circuits 89, 90 and 91 are respectively connected to the OR circuits 92 of the three inputs, and the output from the OR circuit 92 is connected to the switch 97 for opening/closing and controlling the switch 97 connected to the condenser 71 in serial.

The detection circuit 74, integrating circuit 78 and comparator 82 comprise the first pass 100 for supplying an output to the terminal R of the serial-parallel conversion circuit 86, and the relationship between a time constant of the integrating circuit 78 and a reference value of the comparator 82 is designed in such a manner that an output signal is outputted in the case where a transmit electromagnetic wave from the tablet 1 is transmitted for the first predetermined period of time (in the present embodiment, about 350 µs).

The detection circuit 75, integrating circuit 79 and comparator 83 comprise the second pass 101 for supplying an output to the terminal D of the serial-parallel conversion circuit 86, and a relationship between a time constant of the integrating circuit 79 and a reference value of the comparator 83 is designed in such a manner that an output signal is outputted in the case where a transmit electromagnetic wave from the tablet 1 is transmitted for the second predetermined period of time (in the present embodiment, about 150 µs).

The detection circuit 76, integrating circuit 80 and comparator 84 comprise the third pass 102 for supplying an output to the terminal CL of the serial-parallel conversion circuit 86, and a relationship between a time constant of the integrating circuit 80 and a reference value of the comparator 84 is designed in such a manner that an output signal is outputted in the case where a transmit electromagnetic wave from the tablet 1 is transmitted for the third predetermined period of time (in the present embodiment, about 40~50 µs).

The first~third passes constitute one of the characteristics of the present invention.

Figures 23, 24:
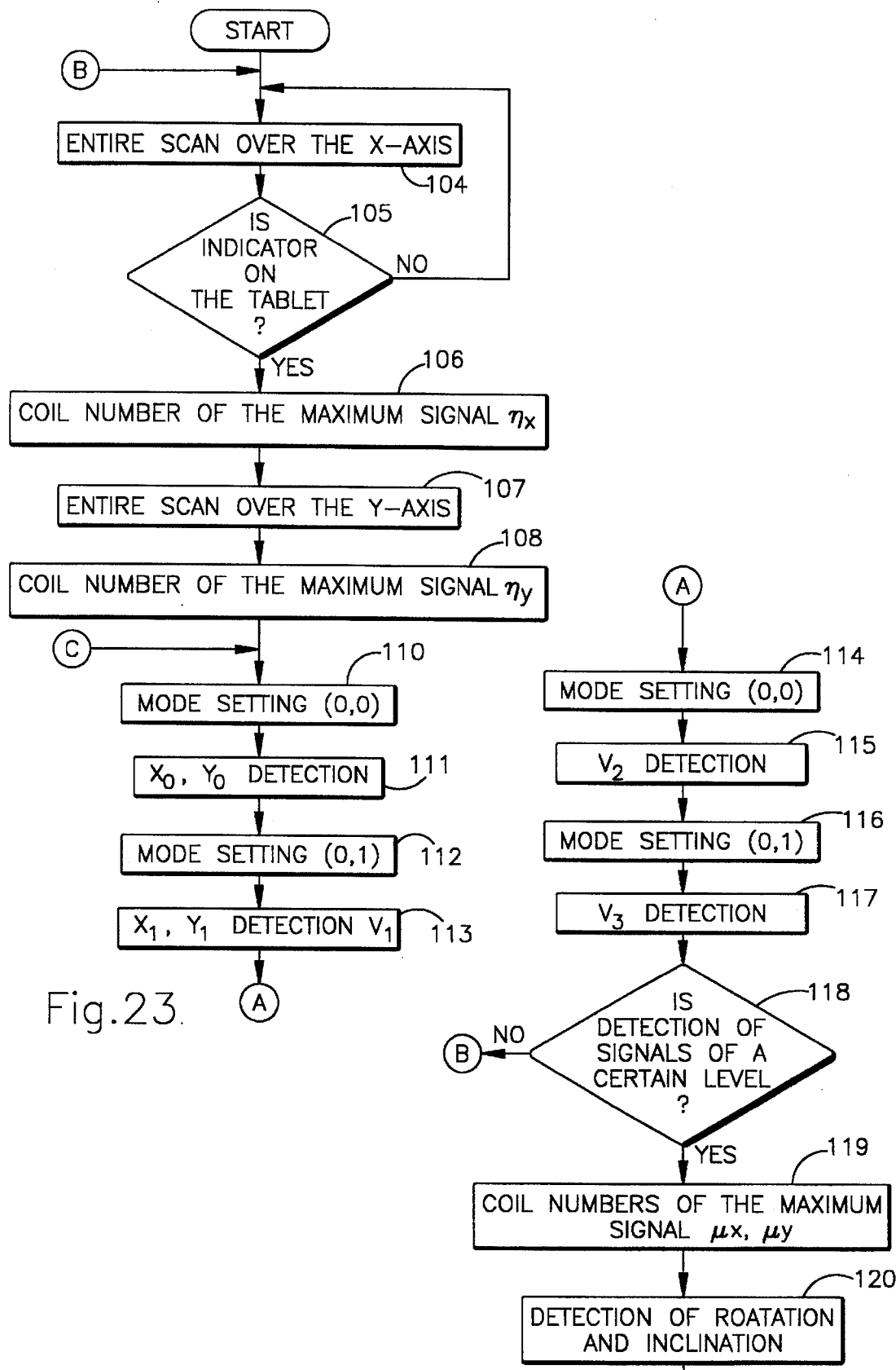
FIG. 23 is a flowchart of an operation control program stored in the CPU 10.
FIG. 24 is a flowchart of an operation control program stored in the CPU 10.

FIGS. 23 and 24 are flowcharts concerning an operation control program stored in the CPU 10.

Furthermore, the coil numbers in the drawings denote the selected loop coils; T a transmission mode (a period of time for transmission from a position detector); R a reception mode (a period of time for reception by a position detector).

Figure 25:
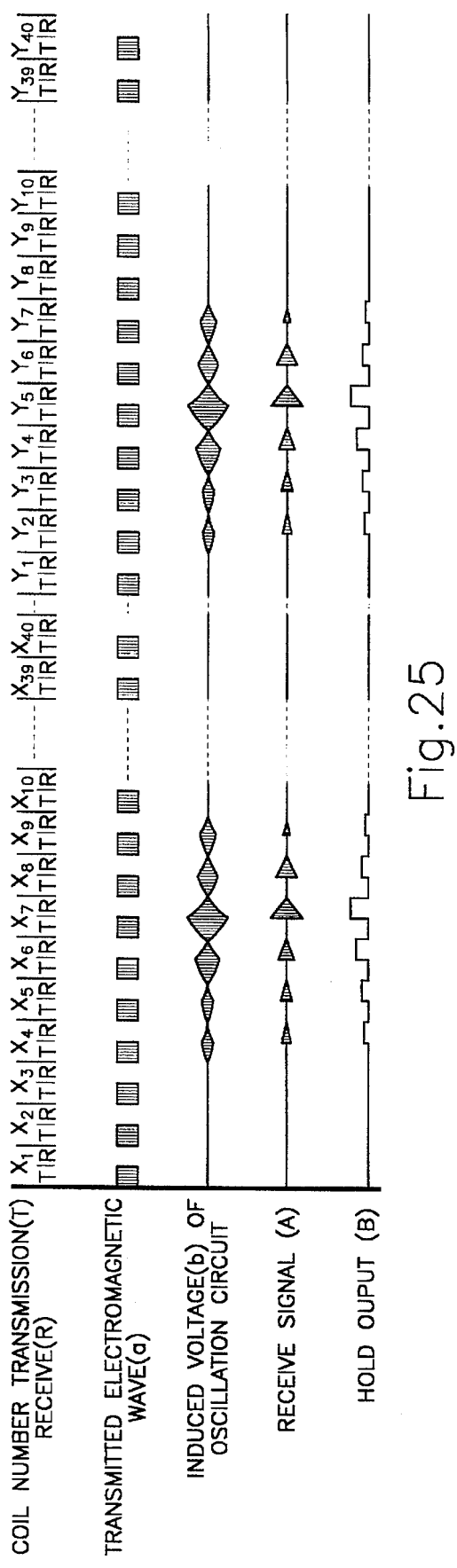
FIG. 25 is an output waveform indicating outputs at the points represented by the symbols X and Y in FIGS. 1 and 21.
Figure 26:
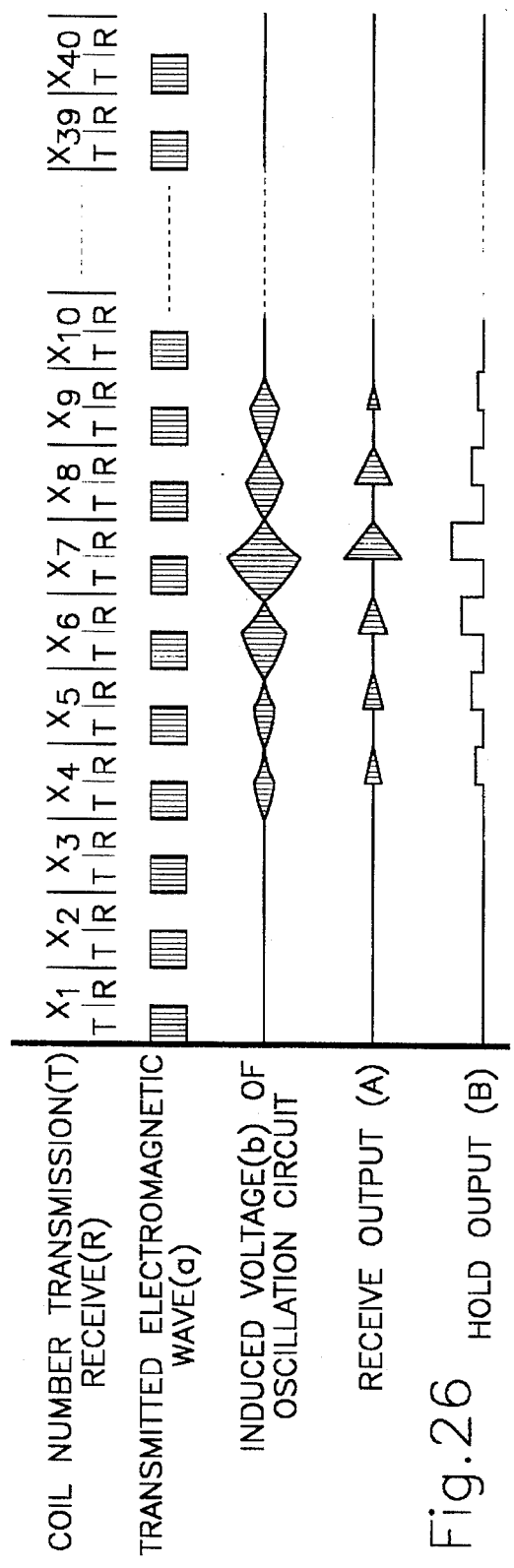
FIG. 26 is an enlarged fragmentary view of a portion of FIG. 25.
Figure 31:
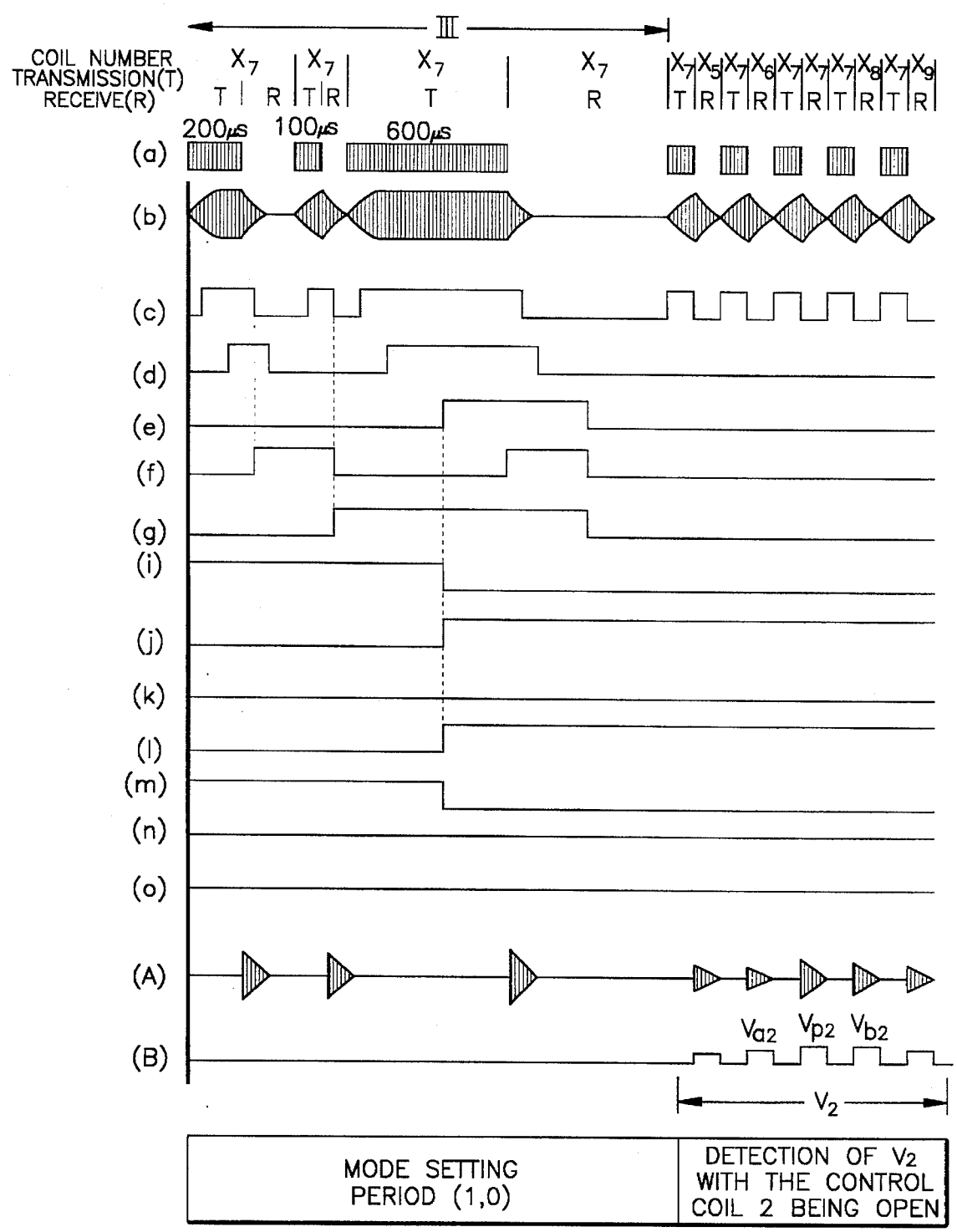
FIG. 31 is an enlarged fragmentary view of a portion of FIG. 28.

FIG. 31 shows how FIGS. 25 and 26 are connected to each other.

Figure 32:
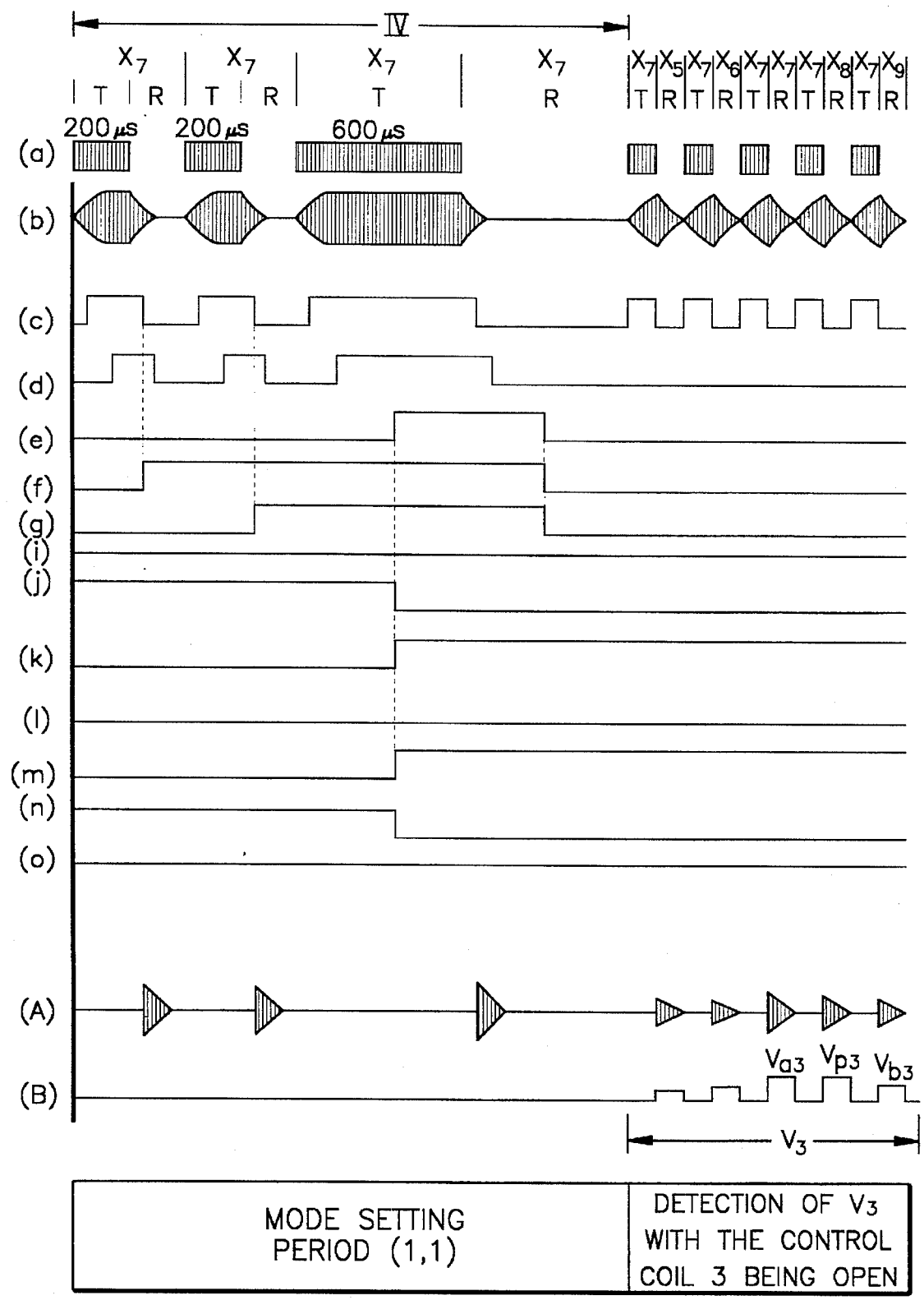
FIG. 32 is an enlarged fragmentary view of a portion of FIG. 28.

FIG. 32 shows how FIGS. 27–30 are connected.

Hereinafter, an operation of the third embodiment having the aforementioned structure will be explained.

First, an entire X-axis scan is conducted in order to detect where the position indicator 60 is placed on the tablet 1 (step 104). The entire scan is conducted in the same manner as the embodiment 1.

Figure 27:
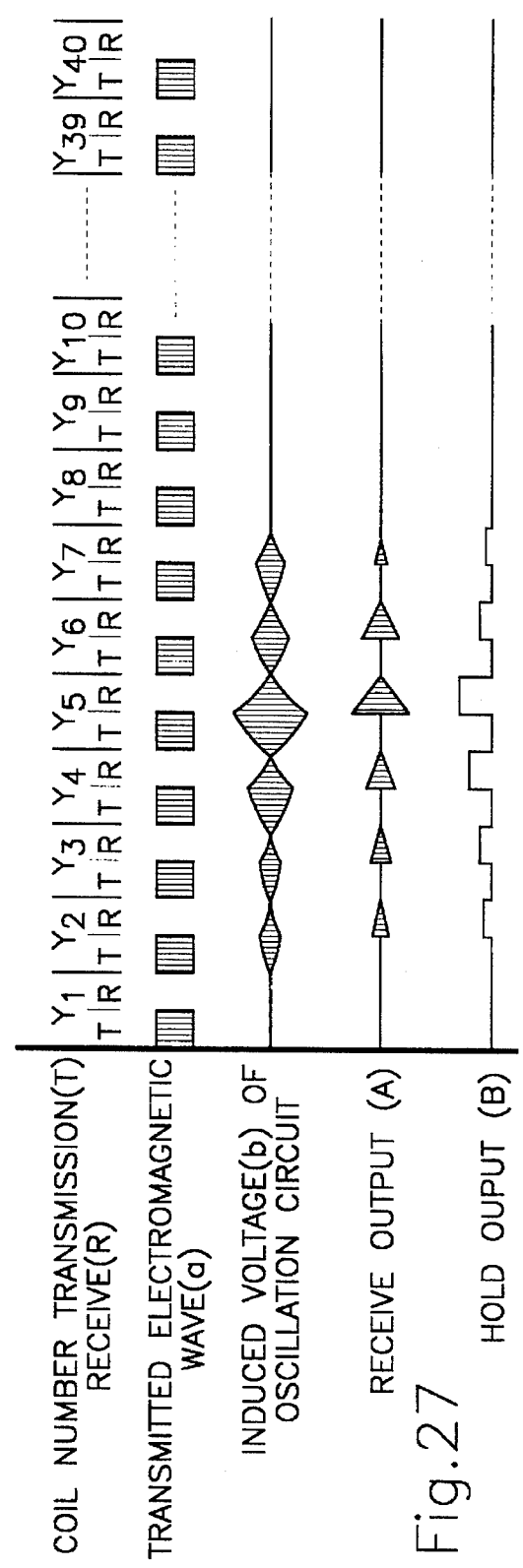
FIG. 27 is an enlarged fragmentary view of a portion of FIG. 25.
Figure 28:
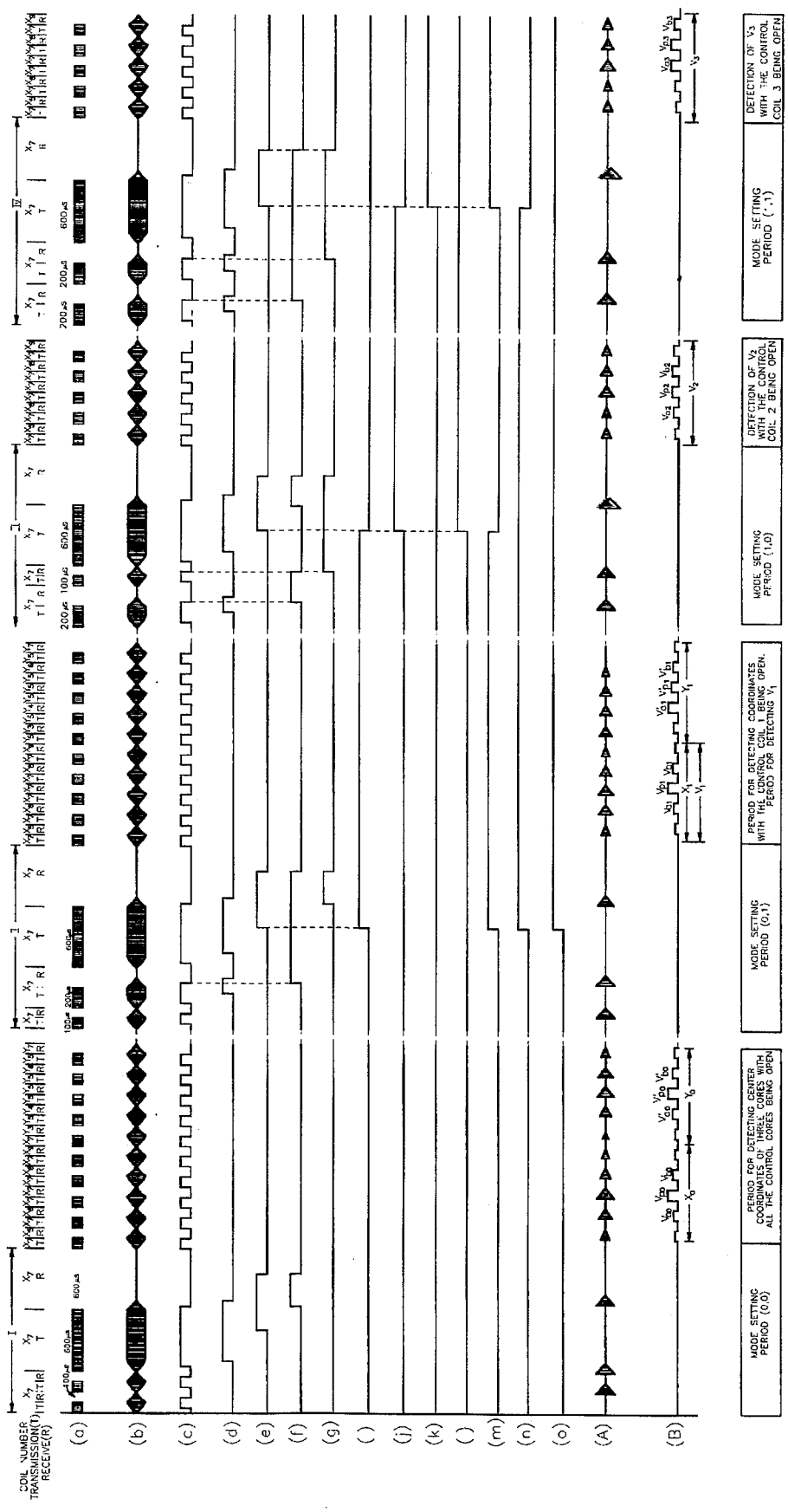
FIG. 28 is an output waveform indicating outputs at the points represented by the symbols X and Y in FIGS. 1 and 21.

By referring to FIGS. 26 and 27, the CPU 10 has the selection circuit 2 select the loop coil $X_1$ to thereby connect the transmission/reception switch circuit 3 to the transmission side terminal T, whereby the transmit electromagnetic wave (a) of a resonant frequency is transmitted to the oscillation circuit 70 from the loop coil $X_1$.

After the CPU 10 carries out the transmission mode for a predetermined period of time, the selection circuit 2 switches the transmission/reception switch circuit 3 to the reception side by maintaining the loop coil $X_1$ as it is, whereby the reception mode for receiving a signal from the position indicator 60 is carried out for a predetermined period of time (for example, R=100 μs).

On the other hand, the switches 94–97 of the position indicator 60 are open in the entire scan mode and thus, the oscillation circuit 70 is excited by the transmit electromagnetic wave (a) to generate an induced voltage. Although the transmit electromagnetic wave (a) is halted in the reception mode, an electromagnetic wave is generated from the transmission coil 68 by the induced voltage. The thus generated electromagnetic wave excites the selected loop coil on the tablet 1 and thereby, an induced voltage is generated in the loop coil. As the induced voltage becomes maximum at the loop coil closest to the position indicator 60, the coordinates of the position indicator 60, that is, a designated location of the position indicator 60 is found in the same manner as the embodiment 1.

The above operation is performed on all the loop coils $X_1 \sim X_{40}$ in the X-axis direction, and the location of the position indicator 60 on the tablet 1 is determined from the information concerning which selected loop coil makes a received signal from the position indicator 60 maximum and the No. of such loop coil is stored (steps 104 and 106). In the present embodiment, the loop coil $X_7$ maximizes the received signal.

In the case where a level of a received signal higher than a predetermined value is not detected in the entire scan in the X-axis direction, it is determined that the position indicator 60 is not on the tablet 1, and the entire scan in the X-axis direction is repeated (step 105).

Upon completion of the X-axis entire scan, the CPU 10 conducts the entire scan in the Y-axis direction. More specifically, the Y-axis scan is conducted in the same manner as the X-axis scan as is indicated in FIG. 26, and the CPU 10 stores the loop coil $Y_5$ as a location in the Y-axis direction of the position indicator 60 on the tablet 1 (steps 107 and 108).

After the coil Nos. (in the present embodiment, $X_7$ and $Y_5$) indicated by the position indicator 60 on the tablet 1 are determined, a partial scan is conducted on the five loop coils preceding $X_7$ and $Y_5$ respectively and the other five loop coils succeeding $X_7$ and $Y_5$ respectively. The partial scan is to detect the location of the position indicator 60 placed on the tablet 1, and in the case where the position indicator 60 is moved on the tablet 1, the partial scan detects the locus thereof.

Figure 29:
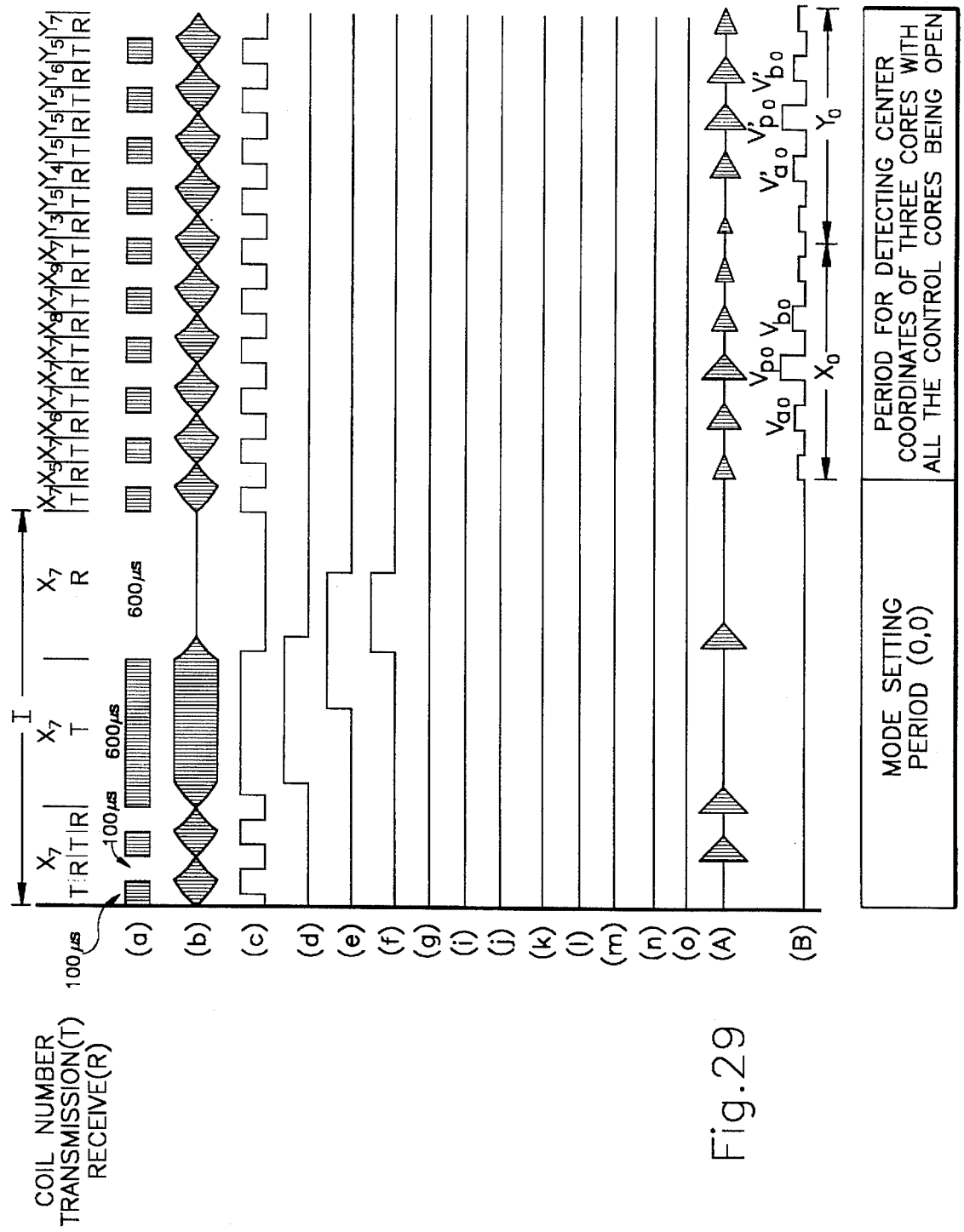
FIG. 29 is an enlarged fragmentary view of a portion of FIG. 28.

The CPU 10 has the selection circuit 2 select the loop coil $X_7$ and connects the transmission/reception switch circuit 3 to the transmission terminal T side (FIG. 29).

In this condition, the CPU 10 transmits to the position indicator 60 a mode signal for opening the control coils 65–67 and carries out a "00" mode setting step.

More specifically, the CPU 10 causes transmission/reception of transmission time T=100 μs, reception time R=100 μs, transmission time T=100 μs, reception time R=100 μs, transmission time T=600 μs, reception time R=600 μs between the position indicator 60 and the tablet 1 (step 110, FIG. 29 I).

The CPU 10 selects the loop coil $X_7$ at the selection circuit 2 and switches the transmission/reception switch circuit 3 to the transmission terminal T side to thereby transmit the transmit electromagnetic wave (a) to the position indicator 60 for a period of T=100 μs. Thereby, the induced voltage (b) is generated at the oscillation circuit 70. The transmission operation for the transmission period T=100 μs is repeated twice. Thus, the output (c) is outputted from the third pass 102 and the output (d) from the second pass 101 is taken in at the fall of the output (c), whereby the outputs (g) and (f) from the serial-parallel conversion circuit 86 to the decoder 87 become "0" and "0" respectively.

Next, the CPU 10 transmits to the position indicator 60 the transmit electromagnetic wave (a) of transmission time T=600 μs in order to convert the "00" data to a switch control signal.

After the transmit electromagnetic wave (a) is continued for 600 μs, the outputs (c), (d) and (e) are generated from the third pass 102, second pass 101 and first pass 100 in this order as is indicated in the drawing. At the rise of the output (e), the output "00" from the serial-parallel conversion circuit 86 is taken into the decoder 87. Then, the decoder 87 outputs "0" and all the switch control signals (l), (m), (n) and (o) become Therefore, switches 94–97 become open. Then, CPU 10 carries out the reception mode for the reception time R=600 μs. Thereby, the induced voltage (b) attenuates and outputs (c), (d) and (e) become "L" level. At the fall of the output (e), the serial-parallel conversion circuit 86 is reset. By this operation, the "00" mode setting for opening the coils 65–68 of their position indicator 60 is completed (step 110).

When the position indicator 60 enters the "00" mode, the CPU 10 moves on to the next step, that is, a partial scan in order to detect the intermediate position of the position indicator 60 (step 111).

The partial scan conducts a transmission/reception of transmission time T=100 μs, reception time R=100 μs from the tablet 1 to the position indicator 60 in the same manner as the embodiment 1. In other words, the CPU 10 has the selection circuit 2 select the loop coil $X_7$ to thereby connect the transmission/reception switch circuit 3 to the transmission side terminal T. In this condition, the loop coil $X_7$ sends out the transmit electromagnetic wave (a) to the position indicator 60.

The oscillation circuit 70 of the position indicator 60 is excited by the transmit electromagnetic wave (a) to generate the induced voltage (b) at the oscillation circuit 70. In response to the induced voltage (b), a uniform AC magnetic field is generated from the cores 62–64. As a result, the intermediate position of the position indicator 60, that is, location of the tip of the pen 61 on the tablet 1 is determined.

After the transmission mode time has passed, the CPU 10 has the selection circuit 2 select the loop coil $X_5$ to switch the transmission/reception switch circuit 3 to the receive terminal R side. In the reception mode of the loop coil $X_5$, the received signals (A) and (B) are obtained on the tablet 1 by the same operation as explained in the step 104.

The partial scan operation selects the loop coil $X_7$ in the transmission mode, while in the reception mode the loop coils $X_6$, $X_7$, $X_8$ and $X_9$ are successively selected and the operation is conducted accordingly (step 111).

As is mentioned above, the position indicator 60 designates the loop coils $X_7$ and $Y_5$ in the present embodiment and therefore, a partial scan in the X-axis direction attains the maximum received voltage $V_{p0}$ in the reception mode of the loop coil $X_7$, while it attains the received voltages $V_{a0}$ and $V_{b0}$ in the reception mode of the loop coils $X_6$ and $X_8$.

The Y-axis partial scan is conducted after a partial scan in the X-axis direction.

More specifically, the loop coil $Y_5$ is selected in the transmission mode, while in the reception mode the loop coils $Y_3$, $Y_4$, $Y_5$, $Y_6$ and $Y_7$ are respectively selected to conduct a partial scan in the Y-axis direction in the same manner as the aforementioned partial scan in the X-axis direction (step 111).

In the partial scan in the Y-axis direction, the maximum received voltage $V'_{p0}$ is obtained in the reception mode of the loop coil $Y_5$, while the received voltages and $V'_{b0}$ are obtained in the reception mode of the loop $V'_{a0}$ coils $Y_4$ and $Y_6$.

The location of the position indicator 60 represents the location corresponding to the intermediate position of the three magnetic substance cores 62~64 (hereinafter, referred to as central coordinates $X_0$, $Y_0$).

Based on the aforementioned received signal voltage (received signal strength), the CPU 10 determines the central coordinates ($X_0$, $Y_0$) of the position indicator 60 from the Formulae (1) and (2) (step 111).

Upon completion of the partial scan for finding the central coordinates in the X-axis and Y-axis directions (step 111), the "01" mode setting operation for opening only the switch 94 in order to open the control coil 65 is started (step 112).

More specifically, the CPU 10 closes the control coils 66 and 67 and transmits to the position indicator 60 a "01" mode signal for opening the control coil 65 to thereby carry out the "01" mode setting step (step 112).

Figure 30:
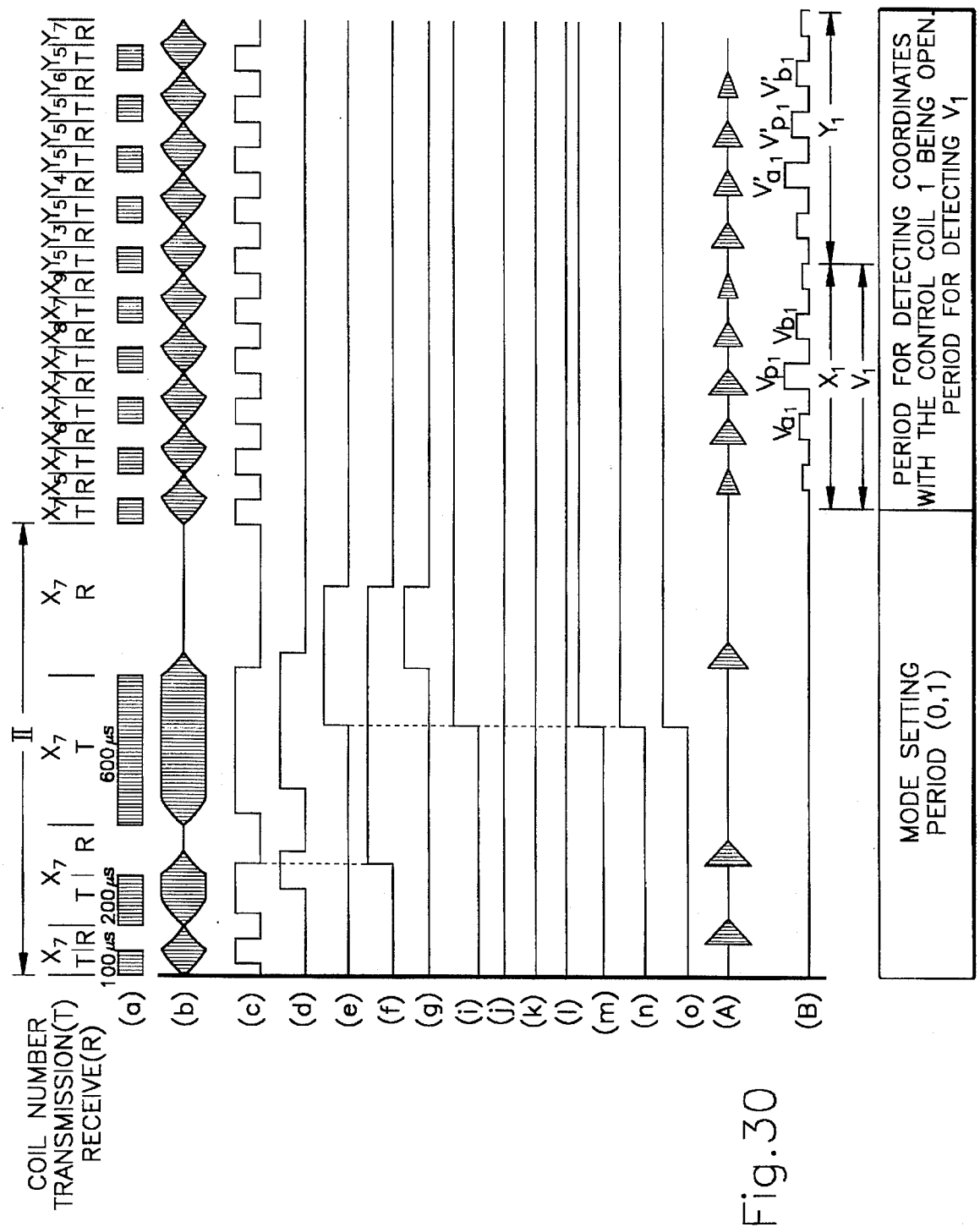
FIG. 30 is an enlarged fragmentary view of a portion of FIG. 28.

The CPU 10 conducts transmission/reception of transmission time T=100 µs, reception time R=100 µs, transmission time T=200 µs, reception time R=200 µs, transmission time T=600 µs, reception time R=600 µs between the position indicator 60 and the tablet 1 (step 112, FIG. 30, II).

The CPU 10 selects the loop coil $X_7$ at the selection circuit 2 to switch the transmission/reception switch circuit 3 to the transmission terminal T side and transmit to the position indicator 60 the transmit electromagnetic wave (a) of T=100 µs. Thereby, the induced voltage (b) is generated at the oscillation circuit 70. By the transmission operation of the transmission time T=100 µs, the output (c) is outputted from the third pass 102, and at the fall of the output (c) the output (d) from the second pass 101 is taken in. Thereby, the outputs (f) and (g) to the decoder 87 become "0" and "0" respectively.

Next, the CPU 10 conducts transmission of T=200 µs from the tablet 1 to the position indicator 60. Thus, the induced voltage (b) is generated at the oscillation circuit 70. By the transmission operation of transmission time T=200 µs, the outputs (c) and (d) are successively outputted from the third pass 102 and second pass 101, and at the fall of the output (c), the output (d) from the second pass 101 is taken into the serial-parallel conversion circuit 86. Thus, the outputs (g) and (f) to the decoder 87 become "0" and "1" respectively.

Next, the CPU 10 transmits to the position indicator 60 the transmit electromagnetic wave (a) for a transmission time of T=600 µs in order to convert the "01" data to a switch control signal.

After the transmit electromagnetic wave (a) is continued for 600 µs, the outputs (c), (d) and (e) are generated from the third pass 102, second pass 101 and first pass 100 in this order. At the rise of the output (e), the output "01" from the serial-parallel conversion circuit 86 is taken into the decoder 87, and the decoder 87 outputs "1". Then, the $Q_1$ output from the decoder 87 becomes "H" level, while the output (i) also becomes "H" level. Thereby, only the output (l) out of the control signals (l), (m), (n) and (o) becomes "L" level and the remaining outputs (m), (n) and (o) become "H" level, corresponding to which the switches 95~97 are closed with the switch 94 being open. Subsequently, the reception mode of reception time R=600 µs is carried out. Thereby, the induced voltage (b) attenuates and the outputs (c), (d) and (e) become "L" level. At the fall of the output (e), the serial-parallel conversion circuit 86 is reset. By this operation, only the control coil 65 of the position indicator 60 is opened while the other coils 66 and 67 are short-circuited. Thus, the "01" mode setting for opening only the coil 65 is completed (step 112).

When the position indicator 60 enters the "01" mode, the CPU 10 moves on to the next step, that is, a partial scan for finding a rotational location of the position indicator 60 (step 113).

More specifically, the CPU 10 has the selection circuit 2 select the loop coil $X_7$ to thereby connect the transmission/reception switch circuit 3 to the transmission side terminal T. In this condition, the loop coil $X_7$ sends out the transmit electromagnetic wave (a) to the position indicator 60. By the transmit electromagnetic wave (a), the oscillation circuit 70 of the position indicator 60 is excited to thereby generate the induced voltage (b) at the oscillation circuit 70.

When the switches 95~97 are closed with the switch 94 being open, a magnetic flux converges on the magnetic substance core 62 of the control coil 65, whereby an electromagnetic wave is sent out from the magnetic substance core 62.

More specifically, by the induced voltage (b) generated at the oscillation circuit 70, an AC magnetic field is generated from the magnetic substance core 62, from which an electromagnetic wave is sent out to the tablet 1. As a result, the tablet 1 detects a location of the rotation with the intermediate position of the position indicator 60 as an axis.

After the transmission mode period has passed, the CPU 10 has the selection circuit 2 select the loop coil $X_5$ to thereby switch the transmission/reception switching circuit 3 to the receive terminal R side. In the reception mode of the loop coil $X_5$, the received signals (A) and (B) are obtained at the tablet 1 by the same operation as explained in the step 104.

The partial scan operation selects the loop coil $X_7$ in the transmission mode, while in the reception mode the loop coils $X_6$, $X_7$, $X_8$ and $X_9$ are selected and the partial scan operation is conducted on them successively.

Since the position indicator 60 designates the loop coils $X_7$ and $Y_5$ in the present embodiment as is mentioned above, the maximum received voltage $V_{p1}$ is obtained in the reception mode of the loop coil $X_7$ during the X-axis partial scan, while the received voltages $V_{a1}$ and $V_{b1}$ are obtained in the reception mode of the loop coils $X_6$ and $X_8$ respectively.

Following the X-axis partial scan, the Y-axis partial scan is performed.

More specifically, the loop coil $Y_5$ is selected in the transmission mode, while the loop coils $Y_3$, $Y_4$, $Y_5$, $Y_6$ and $Y_7$ are respectively selected and the Y-axis partial scan is conducted on them in the same manner as the X-axis partial scan (step 113).

During the Y-axis partial scan, the maximum received voltage $V'_{p1}$ is obtained in the reception mode of the loop coil $Y_5$, while the received voltages $V'_{a1}$ and $V'_{b1}$ are respectively obtained in the reception mode of the loop coils $Y_4$ and $Y_6$ which respectively precede and succeed the loop coil $Y_5$.

The coordinates $(X_7, Y_5)$ of the position indicator 60 represent the location of the magnetic substance core 62 (hereinafter referred to as the rotation coordinates $X_1, Y_1$).

Based on the received signal voltage, the CPU 10 determines the rotation coordinates $(X_1, Y_1)$ from the formulae (3) and (4) (step 113).

Furthermore, the CPU 10 finds the received signal strength correction value $V_1$ which makes maximum the strength of the received signal from the magnetic substance core 62 for determining the inclination of the position indicator 60.

In reference to FIG. 12, a received signal strength becomes maximum in the distribution approximate quadratic curve when the correction value is C. Thus, the value C is obtained from the aforementioned formula (5) as follows;

From the formulae (6) and (8), $$\begin{cases} a(d+b)^2 = V_a - c \\ a(d-b)^2 = V_b - c \end{cases}$$

The difference between the above two formulae is as follows;

$$4adb = V_a - V_b \therefore a = (V_a - V_b)/4db \qquad (16)$$

From the formulae (7) and (16), $$C = V_p - ab^2 = V_p - \frac{V_a - V_b}{4db} \cdot b^2 = V_p - \frac{V_a - V_b}{4d} \cdot b \qquad (17)$$

The formula of b is substituted for the above formula (17) as follows;

$$C = V_p - \frac{V_a - V_b}{4d} \cdot \frac{d(V_b - V_a)}{2(2V_p - V_a - V_b)} = \qquad (18)$$

$$V_p + \frac{(V_a - V_b)^2}{8(2V_p - V_a - V_b)}$$

Therefore, $V_1$ is determined as follows;

$$V_1 = V_{p1} + \frac{(V_{a1} - V_{b1})^2}{8(2V_{p1} - V_{a1} - V_{b1})} \qquad (19)$$

Upon finding the rotation coordinates $(X_1, Y_1)$ of the position indicator 60 and received signal strength correction value $V_1$, the CPU 10 starts a "10" mode setting operation for opening only the switch 95 so as to open only the control coil 66 (step 114).

More specifically, the CPU 10 short-circuits the control coils 65 and 67 and transmits to the position indicator 60 the "10" mode signal for opening the control coil 66 and carries out the "10" mode setting step (step 114).

The CPU 10 causes transmission/reception of transmission time T=200 µs, reception time R=200 µs, transmission time T=100 µs, reception time R=100 µs, transmission time T=600 µs, reception time R=600 µs between the position indicator 60 and the tablet 1 (step 114, FIG. 31, III).

The CPU 10 has the selection circuit 2 select the loop coil $X_7$ to thereby switch the transmission/reception switch circuit 3 to the transmission terminal T side, so that the transmitted electromagnetic wave (a) of T=200 µs is transmitted to the position indicator 60. Thereby, the induced voltage (b) is generated at the oscillation circuit 70. By the transmission operation of T=200 µs, the outputs (c) and (d) are outputted from the third pass 102 and second pass 101. At the fall of the output (c), the output (d) from the second pass 101 is taken into the serial-parallel conversion circuit 86. Thereby, the outputs (g) and (f) to the decoder 87 become "0" and "1" respectively.

Next, the CPU 10 has the position indicator 60 conduct transmission of T=100 µs from the tablet 1. Thereby, the induced voltage (b) is generated at the oscillation circuit 70. By the transmission operation of T=100 µs, the output (c) is outputted from the third pass 102 and at the fall of the output (c), the output (d) from the second pass 101 is taken into the serial-parallel conversion circuit 86. However, as the output (d) is "L" level, the outputs (g) and (f) from the serial-parallel conversion circuit 86 become "1" and "0" respectively.

Next, the CPU 10 transmits the transmit electromagnetic wave (a) to the position indicator 60 for a transmission time T=600 µs so as to convert the "10" data to a switch control signal.

After the transmit electromagnetic wave (a) is continued for 600 µs, the third pass 102, second pass 101 and first pass 100 generate the outputs (c), (d) and (e) in this order as is indicated in the drawings. At the rise of the output (e), the output "10" from the serial-parallel conversion circuit 86 is taken into the decoder 87, and the $Q_2$ output indicating "2" of the decoder 87 becomes "H" level, while the output (j) becomes "H" level. Thereby, only the output (m) of the control signals (l), (m), (n) and (o) of the switches 94-97 becomes "L" level and the other outputs (l), (n) and (o) all become "H" level, while the switches 94, 96 and 97 are closed with the switch 95 alone being open. Subsequently, the CPU 10 carries out a reception mode of reception time R=600 µs. Thus, the induced voltage (b) attenuates and the outputs (c), (d) and (e) become "L" level. At the fall of the output (e), the serial-parallel conversion circuit 86 is reset. By the operation, only the control coil 66 of the position indicator 60 is opened and the other coils 65 and 67 are short-circuited, whereby the "10" mode setting for opening the coil 66 is completed (step 114).

When the position indicator 60 enters the "10" mode, the CPU 10 moves to the next step, that is, a partial scan for detecting a received voltage at the "10" mode (step 115).

More specifically, the CPU 10 has the selection circuit 2 select the loop coil $X_7$ to thereby connect the transmission/reception switch circuit 3 to the transmission side terminal T. In this condition, the loop coil $X_7$ sends the transmit electromagnetic wave (a) to the position indicator 60. By the transmit electromagnetic wave (a), the oscillation circuit 70 of the position indicator 60 is excited and the induced voltage (b) is generated at the oscillation circuit 70.

In the condition where the switch 95 alone is open, a magnetic flux converges in the magnetic substance core 63 of the control coil 66 and an electromagnetic wave is sent out from the location of the magnetic substance core 63.

More specifically, an AC magnetic field is generated from the magnetic substance core 63 by the induced voltage (b) generated at the oscillation circuit 70, and an electromagnetic wave is sent to the tablet 1 from the location of the magnetic body core 63. As a result, the tablet 1 detects the location of the magnetic substance core 63 of the position indicator 60.

After a transmission mode time has passed, the CPU 10 has the selection circuit 2 select the loop coil $X_5$ to thereby switch the transmission/reception switch circuit 3 to the receive terminal R. In the reception mode of the loop coil $X_5$, the received signals (A) and (B) are obtained on the tablet 1 by the same operation as explained in the step 104.

The partial scan operation selects the loop coil $X_7$ in the transmission mode, while in the reception mode the loop coils $X_6$, $X_7$, $X_8$ and $X_9$ are respectively selected and the operation is conducted on the coils successively.

As is mentioned above, the position indicator 60 indicates the loop coils $X_7$ and $Y_5$ in the present embodiment. Therefore, the maximum received voltage $V_{p2}$ is obtained in the reception mode of the loop coil $X_7$ during the partial scan in the X-axis direction, while the received voltages $V_{a2}$ and $V_{b2}$ are obtained in the reception mode of the loop coils $X_6$ and $X_8$. From the following formula, the CPU 10 finds signal strength correction value $V_2$ of the received signal from the magnetic substance core 63 in order to find an inclination of the position indicator 60 (step 115).

$V_{p2}$, $V_{a2}$ and $V_{b2}$ are substituted for the formula (19) as follows.

$$V_2 = V_{p2} + \frac{(V_{a2} - V_{b2})^2}{8(2V_{p2} - V_{a2} - V_{b2})} \qquad (20)$$

Upon finding the received signal strength correction value $V_2$ of the position indicator 60, the CPU 10 starts the "11" mode setting operation for opening only the switch 96 so as to open only the control coil 67 (step 116).

More specifically, the CPU 10 short-circuits the coils 65 and 66 and transmits to the position indicator 60 a "11" mode signal for opening the control coil 67 to carry out the "11" mode setting step (step 116).

The CPU 10 causes transmission/reception of a transmission time T=200 μs, reception time R=200 μs, transmission time T=200 μs, reception time R=200 μs, transmission time T=600 μs, reception time R=600 μs between the position indicator 60 and the tablet 1 (step 116, FIG. 32, IV).

The CPU 10 has the selection circuit 2 select the loop coil $X_7$ to thereby switch the transmission/reception switch circuit 3 to the transmission terminal T side and further transmit the transmit electromagnetic wave (a) to the position indicator 60 for T=200 μs. Thereby, the induced voltage (b) is generated at the oscillation circuit 70. By the transmission operation of a transmission time T=200 μs, the outputs (c) and (d) are outputted from the third pass 102 and second pass 101 and at the fall of the output (c), the output (d) from the second pass 101 is taken into the serial-parallel conversion circuit 86. Thereby, the outputs (g) and (f) to the decoder 87 become "0" and "1".

Next, the CPU 10 has the position indicator 60 conduct transmission of T=200 μs from the tablet 1. Thereby, the induced voltage (b) is generated at the oscillation circuit 70. By the transmission operation of a transmission time T=200 μs, the outputs (c) and (d) are generated from the third pass 102 and second pass 101 and at the fall of the output (c), the output (d) from the second pass 101 is taken into the serial-parallel conversion circuit 86.

Thus, the outputs (g) and (f) from the serial-parallel conversion circuit 86 become "1" and "1" respectively.

Next, the transmit electromagnetic wave (a) is transmitted to the position indicator 60 for a transmission time T=600 μs in order to convert the "11" data to a switch control signal.

After the transmit electromagnetic wave (a) is continued for 600 μs, the outputs (c), (d) and (e) are generated from the third pass 102, second pass 101 and first pass 100 in this order. At the rise of the output (e), the output "11" from the serial-parallel conversion circuit 86 is taken into the decoder 87, and the $Q_3$ output indicating "3" of the decoder 87 becomes "H" level, while the output (k) becomes "H" level. Thereby, only the output (n) out of the control signals (l), (m), (n) and (o) of the switches 94~97 becomes "L" level and the other outputs (l), (m) and (o) all become "H" level,
while the switches 94, 95 and 97 are closed with the switch 96 alone being open. Subsequently, the CPU 10 carries out a reception mode of a reception time R=600 μs. Thus, the induced voltage (b) attenuates, while the outputs (c), (d) and (e) become "L" level. At the fall of the output (e), the serial-parallel conversion circuit 86 is reset. By this operation, the control coil 67 of the position indicator 60 alone is opened and the other coils 65 and 66 are short-circuited, and the "11" mode setting for opening the control coil 67 is completed (step 116).

After the position indicator 60 becomes "11" mode, the CPU 10 moves on to the next step, that is, a partial scan for detecting a received voltage at the "11" mode (step 117).

More specifically, the CPU 10 has the selection circuit 2 select the loop coil $X_7$ to thereby connect the transmission/reception switch circuit 3 to the transmission side terminal T. In this condition, the loop coil $X_7$ transmits the transmit electromagnetic wave (a) to the position indicator 60. By the transmit electromagnetic wave (a), the oscillation circuit 70 of the position indicator 60 is excited to generate the induced voltage at the oscillation circuit 70.

In the condition where the switch 96 alone is open, a magnetic flux converges on the magnetic substance core 64 of the control coil 67, whereby the magnetic substance core 64 sends out an electromagnetic wave.

More specifically, the control coil 67 generates an AC magnetic field by the induced voltage (b) generated at the oscillation circuit 70, while an electromagnetic wave is sent out to the tablet 1 from the location of the magnetic substance core 64. As a result, the location of the magnetic substance core 64 of the position indicator 60 is detected on the tablet 1.

After a transmission mode time has passed, the CPU 10 has the selection circuit 2 select the loop coil $X_5$ to thereby switch the transmission/reception switch circuit 3 to the reception terminal R side. In the reception mode of the loop coil $X_5$, the received signals (A) and (B) are obtained on the tablet 1 by the same operation as explained in the step 104.

The partial scan operation selects the loop coil $X_7$ in the transmission mode, while in the reception mode the loop coils $X_6$, $X_7$, $X_8$ and $X_9$ are respectively selected and the partial scan operation is conducted on them successively.

As is mentioned above, the position indicator 60 indicates the loop coils $X_7$ and $Y_5$ in the present embodiment. Thus, the maximum received voltage $V_{p3}$ is obtained in the reception mode of the loop coil $X_7$ during the partial scan in the X-axis direction, while the received voltages $V_{a3}$ and $V_{b3}$ are obtained in the reception mode of the loop coils $X_6$ and $X_8$. From the following formula, the CPU 10 finds a received signal strength correction value $V_3$ from the magnetic substance core 64 for determining an inclination of the position indicator 60 (step 117).

$V_{p3}$, $V_{a3}$ and $V_{b3}$ are substituted for the formula (19) as follows.

$$V_3 = V_{p3} + \frac{(V_{a3} - V_{b3})^2}{8(2V_{p3} - V_{a3} - V_{b3})} \qquad (21)$$

If it is found from the partial scan operations (steps 110~117) that the received signal level is not more than a predetermined threshold level, the CPU 10 decides that the position indicator 60 is not on the tablet 1 and goes back to step 104 (step 118).

Furthermore, the CPU 10 stores No. of the loop coil which obtains the maximum received signal so that the locus of the position indicator 60 on the tablet 1 is followed (step 119).

Next, the CPU 10 performs a computation of a rotation angle through the formulae (11)~(15) on the basis of the central coordinates $(X_0, Y_0)$ and rotation coordinates $(X_1, Y_1)$.

Next, the CPU 10 determines an inclination of the position indicator 60 through the received signal strength correction values $V_1$, $V_2$ and $V_3$ (step 120).

First, the principle of measurement of the inclination will be explained by way of FIG. 33.

Figure 33:
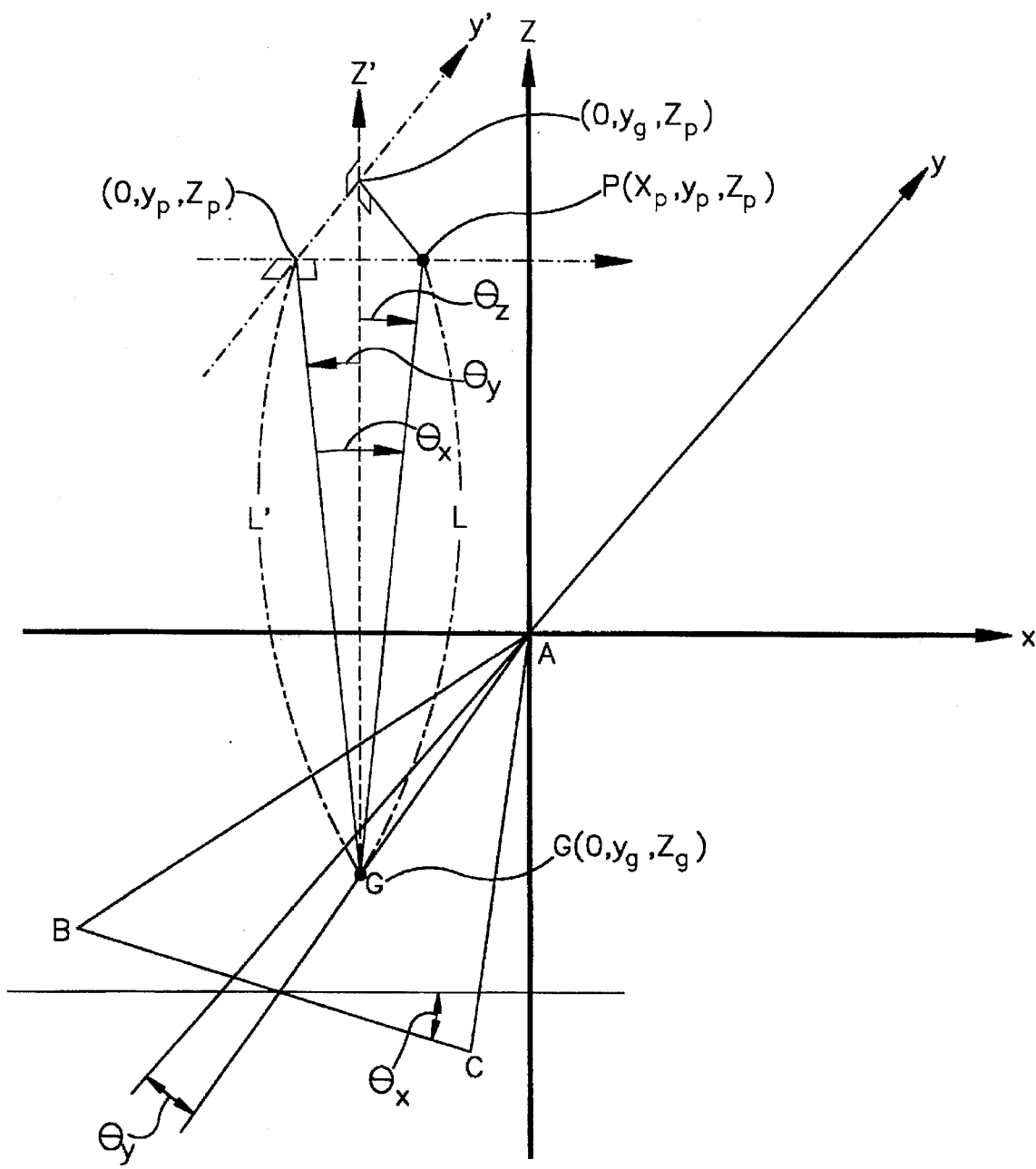
FIG. 33 is a graph for explaining an angle of inclination.

In FIG. 33, the Z-axis represents the height from the loop coil surface on the tablet 1, and the points A, B and C which correspond to the intermediate positions of the cores 62, 63 and 64 form an equilateral triangle, the center G of which is located on the yz surface and the point A corresponding to the direction of the clip 130 of the position indicator 60 (FIG. 22) is on the Z-axis.

Assuming that the locations of the ends of the three cores on the tablet surface side are represented by the points A, B and C, the relationship between the points and the distance from the tablet surface is approximately inversely proportional to the received signal strength correction values $V_1$, $V_2$ and $V_3$ and therefore, the coordinates of each point with the coordinates of the point A being as a basis are A (0, 0, $z_1$), B ($x_2$, $y_2$, $z_2$), C ($x_3$, $y_3$, $z_3$) and G (0, $y_g$, $z_g$).

The inclination ($\theta_x$, $\theta_y$) of the position indicator 60 is found from the following formula.

In FIG. 33, $\theta_x$, $\theta_y$ are represented by the following formula.

$$\sin \theta_x = (Z_2 - Z_3)/r \quad (22)$$
(r: length of one side of an equilateral triangle)

$$\sin \theta_y = (2Z_1 - Z_2 - Z_3)/\sqrt{3}\, r \quad (23)$$

(inclination of the intermediate position between A and BC)

Since the voltage V is inversely proportional to the height z, $Z_1$, $Z_2$ and $Z_3$ are represented as follows with $\alpha$ as a proportional coefficient.

$$Z_1 = \frac{\alpha}{V_1} \quad Z_2 = \frac{\alpha}{V_2} \quad Z_3 = \frac{\alpha}{V_3}$$

Therefore, $\theta_x$ and $\theta_y$ are represented as follows:

$$\theta_x = \sin^{-1} \frac{\alpha(V_3 - V_2)}{r V_2 V_3} \quad (24)$$

$$\theta_y = \sin^{-1} \frac{\alpha(2V_2V_3 - V_1V_3 - V_1V_2)}{\sqrt{3}\, r V_1 V_2 V_3} \quad (25)$$

Thus, as $\alpha/r$ is a constant, $\theta_x$ and $\theta_y$ can be found from the above relational expression if the $\alpha/r$ is found in advance.

($\theta_x$) represents a component in the X-axis direction of the inclination ($\theta_z$) in relation to the Z-axis when the clip 130 is in the Y-axis direction (crosswise inclination). ($\theta_y$) represents a component in the Y-axes (lengthwise inclination). ($\theta_z$) is defined as follows in reference to the upper part of FIG. 33.

Assuming that the point having the distance L on the central axis of the position indicator is P, the point P ($x_p$, $y_p$, $z_p$) can be represented as a point away from the point G (0, $y_g$, $x_g$) by the distance L in the direction perpendicular to the surface of the triangle ABC.

In FIG. 33, x' is a straight line parallel to the X-axis passing the point P, z' being a straight line parallel to the Z-axis passing the point G, y' being a straight line parallel to the y-axis crossing the straight line z'. In this case, the z coordinates of the surface including the straight lines x' and y' assume a constant value $z_p$. Therefore, as is indicated in the drawing, the coordinates of the intersection of the straight lines x' and y' are (0, $y_p$, $z_p$). The distance between the intersection and the point G is L' and the coordinates of the intersection of the straight lines y' and z' are (0, $y_g$, $z_p$).

The angle formed by the straight lines z' and GP, that is, angle formed by the central axis of the position indicator and straight line z' becomes ($\theta_z$) and the following relationship is established. Therefore, ($\theta_z$) is represented by the following formula (26) and can be found from ($\theta_x$, $\theta_y$).

$$\cos\theta_z = (Z_p - Z_g)/L \quad (1)$$

$$\cos\theta_x = L'/L \quad (2)$$

$$\cos\theta_y = (Z_p - Z_g)/L' \quad (3)$$

From the above formula (2), $$L' = L \cos\theta_x \quad (2)'$$

From the above formula (3), $$L' = (Z_p - Z_g)/\cos\theta_y \quad (3)'$$

From the formulae (2)' and (3)', $$L \cos\theta_x = (Z_p - Z_g)/\cos\theta_y \therefore L = (Z_p - Z_g)/\cos\theta_x \cdot \cos\theta_y \quad (4)$$

By substituting (4) for (1), $$\cos\theta_z = \cos\theta_x \cdot \cos\theta_y \therefore z = \cos^{-1}\{\cos\theta_x \cdot \cos\theta_y\} \quad (26)$$

The CPU 10 detects the inclination of the position indicator 60 and then, repeats infra step 110 so as to continue the partial scan.

Although the present embodiment refers to the case where the selection circuit 2 selects the loop coil $X_7$ in the transmission mode, the loop coil X and loop coil Y cross and thus, the loop coil $Y_5$ may be selected in the transmission mode of the partial scan in the X-axis direction, while the loop coil $X_7$ may be selected in the transmission mode of the partial scan in the Y-axis direction.

In the present invention, a position detector utilizing an electromagnetic induction is designed in such a manner that a coil winding in such a manner as to surround a part of a magnetic flux passing the other coil for detecting coordinates is provided in the position indicator and by opening/closing the both ends of the coil to thereby vary distribution of a magnetic flux passing the coil for coordinates detection, a rotation, inclination, etc., of the position indicator are detected.

Therefore, it is possible to detect coordinates close to each other without causing interference between coils.

Furthermore, an inclination of a position indicator and rotation angle having an axis in the direction perpendicular to the tablet of the position indicator can be accurately detected even in the vicinity of an effective area of the position indicator without requiring a separate coil for an oscillation circuit or making the position indicator unnecessarily thick. Furthermore, as the position indicator requires only one oscillation circuit, it is easy to perform adjustment at the time of manufacturing and thereby, manufacturing efficiency is enhanced.

What is claimed is:

1. A position detector comprising:

a position indicator having an oscillation circuit consisting of at least a first coil and condenser, and a tablet which transmits to the position indicator a transmission signal having a predetermined frequency corresponding to a resonance frequency of the oscillation circuit, receives from the oscillation circuit a signal corresponding to the position indicated by the position indicator and finds the position of coordinates of the position indicator on the basis of the received signal, characterized in that the position indicator comprises:

a control coil put side by side with the first coil so that a part of a magnetic flux generated at the first coil by an induced current running through the first coil passes;

a first control means which opens/closes the control coil in response to an operation mode indication signal transmitted from the tablet;

a second control means which corrects a resonant frequency of the oscillation circuit so that it coincides with the predetermined frequency of the transmitted signal when the control coil is controlled to be opened/closed by the first control means.

2. A position detector comprising:

a position indicator having an oscillation circuit consisting of at least a first coil and condenser, and a tablet which transmits to the position indicator a transmission signal having a predetermined frequency corresponding to a resonance frequency of the oscillation circuit, receives from the oscillation circuit a signal corresponding to the position indicated by the position indicator and finds the position of coordinates of the position indicator on the basis of the received signal, characterized in that (A) the position indicator comprises:

(a) a control coil put side by side with the first coil so that a part of a magnetic flux generated at the first coil by an induced current running through the first coil passes, (b) a first control means which opens/closes the control coil in response to an operation mode indication signal transmitted from the tablet, (c) a second control means for correcting a resonant frequency of the oscillation circuit so that it coincides with a predetermined frequency of the transmission signal when the control coil is controlled to be opened/closed by the first control means; and that (B) the tablet comprises:

(d) a means which generates a first operation mode indication signal for the first control means to open the control coil, (e) a means for determining first coordinates on the basis of a received signal from the position indicator in the first operation mode, (f) a means for generating a second operation mode signal for the first control means to close the control coil, (g) a means for determining second coordinates on the basis of a received signal from the position indicator in the second operation mode, (h) a means for detecting the location of coordinates of the position indicator from the first or second coordinates, (i) a means for detecting an angle of rotation having an axis perpendicular to the tablet surface of the position indicator on the basis of the first and second coordinates.

3. A position detector defined by claim 1, characterized in that the first control means comprises a means for detecting a period of generation of an induced voltage generated at the oscillation circuit which is maintained in accordance with a transmission time of the transmission signal.

4. A position detector defined by claim 2, characterized in that the first control means comprises a means for detecting a period of generation of an induced voltage generated at the oscillation circuit which is maintained in accordance with a transmission time of the transmission signal.

5. A position detector defined by claim 1, characterized in that the first control means includes an integrating circuit and comparator and that a transmission time of the transmission signal is determined based on a time constant of the integrating circuit and reference voltage of the comparator.

6. A position detector defined by claim 2, characterized in that the first control means includes an integrating circuit and comparator and that a transmission time of the transmission signal is determined based on a time constant of the integrating circuit and reference voltage of the comparator.

7. A position detector defined by claim 3, characterized in that the first control means includes an integrating circuit and comparator and that a transmission time of the transmission signal is determined based on a time constant of the integrating circuit and reference voltage of the comparator.

8. A position detector defined by claim 4, characterized in that the first control means includes an integrating circuit and comparator and that a transmission time of the transmission signal is determined based on a time constant of the integrating circuit and reference voltage of the comparator.

9. A position detector defined by claim 1, characterized in that the first coil is wound around at least two rod type magnetic substance cores which are bound together and disposed parallely with each other in the position indicating part of the position indicator; and that the control coil is wound around at least one of the magnetic substance cores.

10. A position detector defined by claim 2, characterized in that the first coil is wound around at least two rod-type magnetic substance cores which are bound together and disposed parallely with each other in the position indicating part of the position indicator; and that the control coil is wound around at least one of the magnetic substance cores.

11. A position detector defined by claim 3, characterized in that the first coil is wound around at least two rod-type magnetic substance cores which are bound together and disposed parallely with each other in the position indicating part of the position indicator; and that the control coil is wound around at least one of the magnetic substance cores.

12. A position detector defined by claim 4, characterized in that the first coil is wound around at least two rod-type magnetic substance cores which are bound together and disposed parallely with each other in the position indicating part of the position indicator; and that the control coil is wound around at least one of the magnetic substance cores.

13. A position detector defined by claim 5, characterized in that the first coil is wound around at least two rod-type magnetic substance cores which are bound together and disposed parallely with each other in the position indicating part of he position indicator; and that the control coil is wound around at least one of the magnetic substance cores.

14. A position detector defined by claim 6, characterized in that the first coil is wound around at least two rod-type magnetic substance cores which are bound together and disposed parallely with each other in the position indicating pat of the position indicator; and that the control coil is wound around at least one of the magnetic substance cores.

15. A position detector defined by claim 7, characterized in that the first coil is wound around at least two rod-type magnetic substance cores which are bound together and disposed parallely with each other in the position indicating part of the position indicator; and that the control coil is wound around at least one of the magnetic substance cores.

16. A position detector defined by claim 8, characterized in that the first coil is wound around at least two rod-type magnetic substance cores which are bound together and disposed parallely with each other in the position indicating part of the position indicator; and that the control coil is wound around at least one of the magnetic substance cores.

17. A position detector defined by claim 2, characterized in that the means for generating the first and second operation mode indication signals is a means for making a transmission time of a transmission signal to the position indicator a predetermined different transmission time.

18. A position detector comprising:

a position indicator having an oscillation circuit consisting of at least a first coil and condenser, and a tablet which transmits to the position indicator a transmission signal having a predetermined frequency corresponding to a resonance frequency of the oscillation circuit, receives from the oscillation circuit a signal corresponding to the position indicated by the position indicator and finds the position of coordinates of the position indicator on the basis of the received signal, characterized in that (A) the position indicator comprises:

(a) a plurality of control coils put side by side with the first coil so that a part of a magnetic flux generated at the first coil by an induced current running through the first coil passes, (b) a first control means which controls an opening/closing of the respective control coils in response to an operation mode indication signal transmitted from the tablet, (c) a second control means for correcting a resonant frequency of the oscillation circuit so that it coincides with a predetermined frequency of the transmission signal when the said plurality of control coils are respectively controlled to be opened/closed by the first control means.

19. A position detector defined by claim 18, characterized in that the first coil is wound around three rod-type magnetic substance cores which are bound together in such a manner that centers of the bound cores form an equilateral triangle and the middle point of the triangle corresponds to the central axis of the position indicator, while the control coil is wound around the respective magnetic substance cores.

20. A position detector defined by claim 18, characterized in that the first control means comprises:

a means for detecting a period of generation of an induced voltage generated at the oscillation circuit which is maintained in accordance with the transmission time of the transmission signal, a means for detecting the transmission time of the transmission signal on the basis of the period of generation of the induced voltage and converting the transmission signal to a binary code, a means for controlling the respective control coils on the basis of the contents of the binary code.

21. A position detector defined by claim 19, characterized in that the first control means comprises:

a means for detecting a period of generation of an induced voltage generated at the oscillation circuit which is maintained in accordance with the transmission time of the transmission signal, a means for detecting the transmission time of the transmission signal on the basis of the period of generation of the induced voltage and converting the transmission signal to a binary code, a means for controlling the respective control coils on the basis of the contents of the binary code.

22. A position detector defined by claim 18, characterized in that the first control means comprises plural pairs of integrating circuits and comparators, detects a transmission time of the transmission signals differing from pair and pair on the basis of each time constant of the integrating circuits and a reference voltage of the comparators, and converts the transmission signal to a binary code according to the detected transmitted time of each pair.

23. A position detector defined by claim 19, characterized in that the first control means comprises plural pairs of integrating circuits and comparators, detects a transmission time of the transmission signals differing from pair and pair on the basis of each time constant of the integrating circuits and a reference voltage of the comparators, and converts the transmission signal to a binary code according to the detected transmitted time of each pair.

24. A position detector defined by claim 20, characterized in that the first control means comprises plural pairs of integrating circuits and comparators, detects a transmission time of the transmission signals differing from pair to pair on the basis of each time constant of the integrating circuits and a reference voltage of the comparators, and converts the transmission signal to a binary code according to the detected transmitted time of each pair.

25. A position detector defined by claim 21, characterized in that the first control means comprises plural pairs of integrating circuits and comparators, detects a transmission time of the transmission signals differing from pair and pair on the basis of each time constant of the integrating circuits and a reference voltage of the comparators, and converts the transmission signal to a binary code according to the detected transmitted time of each pair.

26. A position detector comprising:

a position indicator having an oscillation circuit consisting of at least a first coil and condenser, and a tablet which transmits to the position indicator a transmission signal having a predetermined frequency corresponding to a resonance frequency of the oscillation circuit, receives from the oscillation circuit a signal corresponding to the position indicated by the position indicator and finds the position of coordinates of the position indicator on the basis of the received signal, characterized in that (A) the position indicator comprises:

(a) a plurality of control coils put side by side with the first coil so that a part of a magnetic flux generated at the first coil by an induced current running through the first coil passes, (b) a first control means which controls an opening/closing of the respective control coils in response to an operation mode indication signal transmitted from the tablet, (c) a second control means for correcting a resonant frequency of the oscillation circuit so that it coincides with a predetermined frequency of the transmission signal when the said plurality of control coils are respectively controlled to be opened/closed by the first control means; and that (B) the tablet comprises:

(d) a means which generates a plurality of different operation mode signals for the first control means to open/close the plurality of control coils respectively, (e) a means for finding a maximum strength of the respective received signals from the position indicator in a plurality of different operation modes, (f) a means for determining an angle of inclination in relation to the tablet surface of the position indicator on the basis of the maximum strength of the respective received signals.

27. A position detector defined by claim 26, characterized in that the tablet comprises:

(g) a means for generating an operation mode indication signal for the first control means to open all of the plurality of control coils, (h) a means for determining coordinates of the position indicator on the basis of the received signal from position indicator in the aforementioned operation mode.

28. A position detector defined by claim 26, characterized in that the tablet comprises:

(i) a means for generating an operation mode indication signal for the first control means to open all of the plurality of control coils, (j) a first means for determining coordinates of the position indicator on the basis of the received signal from the position indicator in the aforementioned operation mode, (k) a means which generates an operation mode indication signal for the first control means to open only one of the plurality of control coils, (l) a second means for determining coordinates of the opened control coil on the basis of the received signal from the position indicator in the aforementioned operation mode, (m) a means for detecting an angle of rotation having an axis perpendicular to the tablet surface of the position indicator on the basis of the coordinates found by the said first and second means.

29. A position detector defined by claim 27, characterized in that the tablet comprises:

(i) a means for generating an operation mode indication signal for the first control means to open all of the plurality of control coils, (j) a first means for determining coordinates of the position indicator on the basis of the received signal from the position indicator in the aforementioned operation mode, (k) a means which generates an operation mode indication signal for the first control means to open only one of the plurality of coils, (l) a second means for determining coordinates of the opened control coil on the basis of the received signal from the position indicator in the aforementioned operation mode, (m) a means for detecting an angle of rotation having an axis perpendicular to the tablet surface of the position indicator on the basis of the coordinates found by the said first and second means.

30. A position detector defined by claim 26, characterized in that the first coil is wound around three rod-type magnetic substance cores which are bound together in such a manner that centers on the bound cores form an equilateral triangle and the middle point of the triangle corresponds to the central axis of the position indicator;

that the control coil is wound around the respective magnetic substance cores;

that the means for generating a plurality of operation mode signals is three kinds of operation mode signals which open the three control coils one by one;

that the means for finding a maximum strength of the received signal detects a strength of a received signal to be transmitted to the tablet from the magnetic substance core around which an opened control coil is wound; and that the means for determining an angle of inclination determines an angle of inclination on the basis of a strength of the three received signals corresponding to the three kinds of operation modes.

31. A position detector defined by claim 27, characterized in that the first coil is wound around three rod-type magnetic substance cores which are bound together in such a manner that centers on the bound cores form an equilateral triangle and the middle point of the triangle corresponds to the central axis of the position indicator;

that the control coil is wound around the respective magnetic substance cores;

that the means for generating a plurality of operation mode signals is three kinds of operation mode signals which open the three control coils one by one;

that the means for finding a maximum strength of the received signal detects a strength of a received signal to be transmitted to the tablet from the magnetic substance core around which an opened control coil is wound; and that the means for determining an angle of inclination determines an angle of inclination on the basis of a strength of the three received signals corresponding to the three kinds of operation modes.

32. A position detector defined by claim 28, characterized in that the first coil is wound around three rod-type magnetic substance cores which are bound together in such a manner that centers on the bound cores form an equilateral triangle and the middle point of the triangle corresponds to the central axis of the position indicator;

that the control coil is wound around the respective magnetic substance cores;

that the means for generating a plurality of operation mode signals is three kinds of operation mode signals which open the three control coils one by one;

that the means for finding a maximum strength of the received signal detects a strength of a received signal to be transmitted to the tablet from the magnetic substance core around which an opened control coil is wound; and that the means for determining an angle of inclination determines an angle of inclination on the basis of a strength of the three received signals corresponding to the three kinds of operation modes.

33. A position detector defined by claim 29, characterized in
that the first coil is wound around three rod-type magnetic substance cores which are bound together in such a manner that centers on the bound cores form an equilateral triangle and the middle point of the triangle corresponds to the central axis of the position indicator;
that the control coil is wound around the respective magnetic substance cores;
that the means for generating a plurality of operation mode signals is three kinds of operation mode signals which open the three control coils one by one;
that the means for finding a maximum strength of the received signal detects a strength of a received signal to be transmitted to the tablet from the magnetic substance core around which an opened control coil is wound; and
that the means for determining an angle of inclination determines an angle of inclination on the basis of a strength of the three received signals corresponding to the three kinds of operation modes.

34. A position detector defined by claim 26, characterized in that the means for generating the operation mode signal comprises:
a means for generating two kinds of transmission signals having different transmission time to the position indicator, and
a means for combining the two kinds of transmission signals and transmitting an operation mode signal to the position indicator in a binary code.

35. A position detector defined by claim 27, characterized in that the means for generating the operation mode signal comprises:
a means for generating two kinds of transmission signals having different transmission time to the position indicator, and
a means for combining the two kinds of transmission signals and transmitting an operation mode signal to the position indicator in a binary code.

36. A position detector defined by claim 28, characterized in that the means for generating the operation mode signal comprises:
a means for generating two kinds of transmission signals having different transmission time to the position indicator, and
a means for combining the two kinds of transmission signals and transmitting an operation mode signal to the position indicator in a binary code.

37. A position detector defined by claim 29, characterized in that the means for generating the operation mode signal comprises:
a means for generating two kinds of transmission signals having different transmission time to the position indicator, and
a means for combining the two kinds of transmission signals and transmitting an operation mode signal to the position indicator in a binary code.

38. A position detector defined by claim 30, characterized in that the means for generating the operation mode signal comprises:
a means for generating two kinds of transmission signals having different transmission time to the position indicator, and
a means for combining the two kinds of transmission signals and transmitting an operation mode signal to the position indicator in a binary code.

39. A position detector defined by claim 31, characterized in that the means for generating the operation mode signal comprises:
a means for generating two kinds of transmission signals having different transmission time to the position indicator, and
a means for combining the two kinds of transmission signals and transmitting an operation mode signal to the position indicator in a binary code.

40. A position detector defined by claim 32, characterized in that the means for generating the operation mode signal comprises:
a means for generating two kinds of transmission signals having different transmission time to the position indicator, and
a means for combining the two kinds of transmission signals and transmitting an operation mode signal to the position indicator in a binary code.

41. A position detector defined by claim 33, characterized in that the means for generating the operation mode signal comprises:
a means for generating two kinds of transmission signals having different transmission time to the position indicator, and
a means for combining the two kinds of transmission signals and transmitting an operation mode signal to the position indicator in a binary code.

42. A position detector defined by claim 26, characterized in that the first control means comprises:
a means for detecting a period of generation of an induced voltage generated at the oscillation circuit which is maintained according to a transmission time of the transmission signals,
a means for detecting a transmission time of the transmission signals based on the period of generation of an induced voltage and converting the transmission signals to a binary code, and
a means for controlling the respective control coils on the basis of the contents of the binary code.

43. A position detector defined by claim 27, characterized in that the first control means comprises:
a means for detecting a period of generation of an induced voltage generated at the oscillation circuit which is maintained according to a transmission time of the transmission signals,
a means for detecting a transmission time of the transmission signals based on the period of generation of an induced voltage and converting the transmission signals to a binary code, and
a means for controlling the respective control coils on the basis of the contents of the binary code.

44. A position detector defined by claim 28, characterized in that the first control means comprises:
a means for detecting a period of generation of an induced voltage generated at the oscillation circuit which is maintained according to a transmission time of the transmission signals,
a means for detecting a transmission time of the transmission signals based on the period of generation of an induced voltage and converting the transmission signals to a binary code, and
a means for controlling the respective control coils on the basis of the contents of the binary code.

45. A position detector defined by claim 29, characterized in that the first control means comprises:

a means for detecting a period of generation of an induced voltage generated at the oscillation circuit which is maintained according to a transmission time of the transmission signals, a means for detecting a transmission time of the transmission signals based on the period of generation of an induced voltage and converting the transmission signals to a binary code, and a means for controlling the respective control coils on the basis of the contents of the binary code.

46. A position detector defined by claim 30, characterized in that the first control means comprises:

a means for detecting a period of generation of an induced voltage generated at the oscillation circuit which is maintained according to a transmission time of the transmission signals, a means for detecting a transmission time of the transmission signals based on the period of generation of an induced voltage and converting the transmission signals to a binary code, and a means for controlling the respective control coils on the basis of the contents of the binary code.

47. A position detector defined by claim 31, characterized in that the first control means comprises:

a means for detecting a period of generation of an induced voltage generated at the oscillation circuit which is maintained according to a transmission time of the transmission signals, a means for detecting a transmission time of the transmission signals based on the period of generation of an induced voltage and converting the transmission signals to a binary code, and a means for controlling the respective control coils on the basis of the contents of the binary code.

48. A position detector defined by claim 32, characterized in that the first control means comprises:

a means for detecting a period of generation of an induced voltage generated at the oscillation circuit which is maintained according to a transmission time of the transmission signals, a means for detecting a transmission time of the transmission signals based on the period of generation of an induced voltage and converting the transmission signals to a binary code, and a means for controlling the respective control coils on the basis of the contents of the binary code.

49. A position detector defined by claim 33, characterized in that the first control means comprises:

a means for detecting a period of generation of an induced voltage generated at the oscillation circuit which is maintained according to a transmission time of the transmission signals, a means for detecting a transmission time of the transmission signals based on the period of generation of an induced voltage and converting the transmission signals to a binary code, and a means for controlling the respective control coils on the basis of the contents of the binary code.

50. A position detector defined by claim 34, characterized in that the first control means comprises:

a means for detecting a period of generation of an induced voltage generated at the oscillation circuit which is maintained according to a transmission time of the transmission signals, a means for detecting a transmission time of the transmission signals based on the period of generation of an induced voltage and converting the transmission signals to a binary code, and a means for controlling the respective control coils on the basis of the contents of the binary code.

51. A position detector defined by claim 35, characterized in that the first control means comprises:

a means for detecting a period of generation of an induced voltage generated at the oscillation circuit which is maintained according to a transmission time of the transmission signals, a means for detecting a transmission time of the transmission signals based on the period of generation of an induced voltage and converting the transmission signals to a binary code, and a means for controlling the respective control coils on the basis of the contents of the binary code.

52. A position detector defined by claim 36, characterized in that the first control means comprises:

a means for detecting a period of generation of an induced voltage generated at the oscillation circuit which is maintained according to a transmission time of the transmission signals, a means for detecting a transmission time of the transmission signals based on the period of generation of an induced voltage and converting the transmission signals to a binary code, and a means for controlling the respective control coils on the basis of the contents of the binary code.

53. A position detector defined by claim 37, characterized in that the first control means comprises:

a means for detecting a period of generation of an induced voltage generated at the oscillation circuit which is maintained according to a transmission time of the transmission signals, a means for detecting a transmission time of the transmission signals based on the period of generation of an induced voltage and converting the transmission signals to a binary code, and a means for controlling the respective control coils on the basis of the contents of the binary code.

54. A position detector defined by claim 38, characterized in that the first control means comprises:

a means for detecting a period of generation of an induced voltage generated at the oscillation circuit which is maintained according to a transmission time of the transmission signals, a means for detecting a transmission time of the transmission signals based on the period of generation of an induced voltage and converting the transmission signals to a binary code, and a means for controlling the respective control coils on the basis of the contents of the binary code.

55. A position detector defined by claim 39, characterized in that the first control means comprises:

a means for detecting a period of generation of an induced voltage generated at the oscillation circuit which is maintained according to a transmission time of the transmission signals, a means for detecting a transmission time of the transmission signals based on the period of generation of an induced voltage and converting the transmission signals to a binary code, and a means for controlling the respective control coils on the basis of the contents of the binary code.

56. A position detector defined by claim 40, characterized in that the first control means comprises:

a means for detecting a period of generation of an induced voltage generated at the oscillation circuit which is maintained according to a transmission time of the transmission signals, a means for detecting a transmission time of the transmission signals based on the period of generation of an induced voltage and converting the transmission signals to a binary code, and a means for controlling the respective control coils on the basis of the contents of the binary code.

57. A position detector defined by claim 41, characterized in that the first control means comprises:

a means for detecting a period of generation of an induced voltage generated at the oscillation circuit which is maintained according to a transmission time of the transmission signals, a means for detecting a transmission time of the transmission signals based on the period of generation of an induced voltage and converting the transmission signals to a binary code, and a means for controlling the respective control coils on the basis of the contents of the binary code.

58. A position detector defined by claim 26, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

59. A position detector defined by claim 27, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

60. A position detector defined by claim 28, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

61. A position detector defined by claim 29, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

62. A position detector defined by claim 30, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

63. A position detector defined by claim 31, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

64. A position detector defined by claim 32, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

65. A position detector defined by claim 33, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

66. A position detector defined by claim 34, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

67. A position detector defined by claim 35, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

68. A position detector defined by claim 36, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

69. A position detector defined by claim 37, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

70. A position detector defined by claim 38, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

71. A position detector defined by claim 39, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

72. A position detector defined by claim 40, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

73. A position detector defined by claim 41, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

74. A position detector defined by claim 42, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

75. A position detector defined by claim 43, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

76. A position detector defined by claim 44, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

77. A position detector defined by claim 45, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

78. A position detector defined by claim 46, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

79. A position detector defined by claim 47, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

80. A position detector defined by claim 48, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

81. A position detector defined by claim 49, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

82. A position detector defined by claim 50, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

83. A position detector defined by claim 51, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

84. A position detector defined by claim 52, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

85. A position detector defined by claim 53, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

86. A position detector defined by claim 54, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

87. A position detector defined by claim 55, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

88. A position detector defined by claim 56, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

89. A position detector defined by claim 57, characterized in that the first control means comprises a plurality of pairs of integrating circuits and comparators, detects a transmission time of the transmission signals different from pair to pair based on each time constant of the integrating circuits and a reference voltage of the comparators, and converts the transmission signals to a binary code according the detected transmission time of each pair.

* * * * *